June 26, 1928.  1,675,251
P. J. CLIFFORD
AUTOMATIC TRAIN STOP MECHANISM
Original Filed April 17, 1922    12 Sheets-Sheet 3
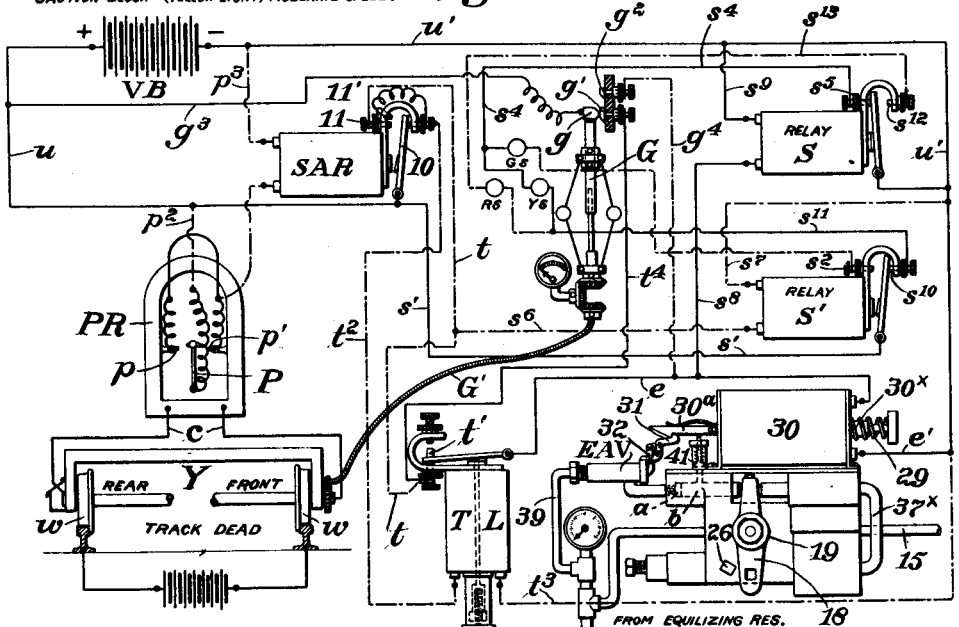
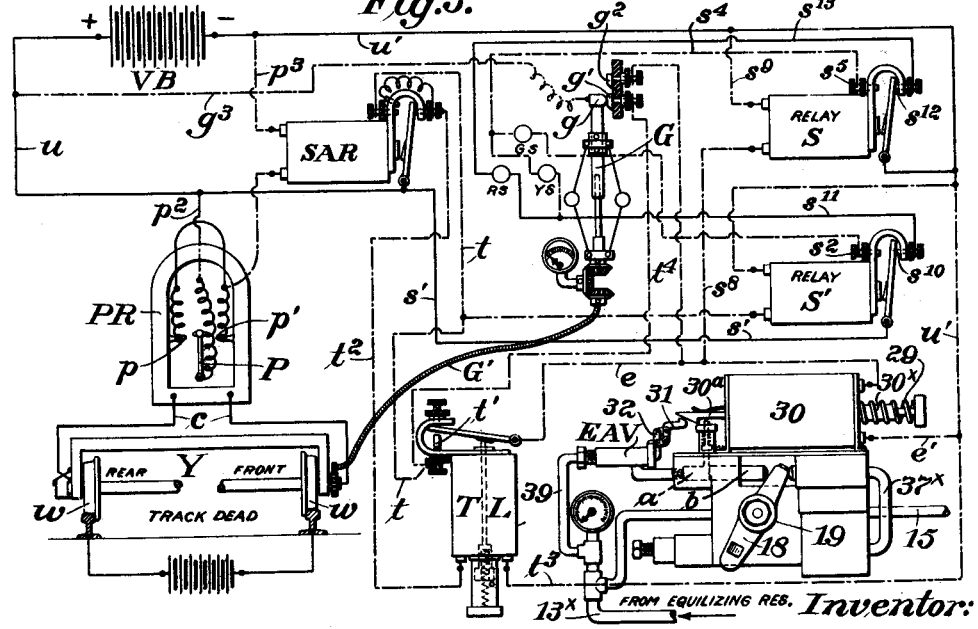
Inventor:
Patrick J. Clifford,
Attys.

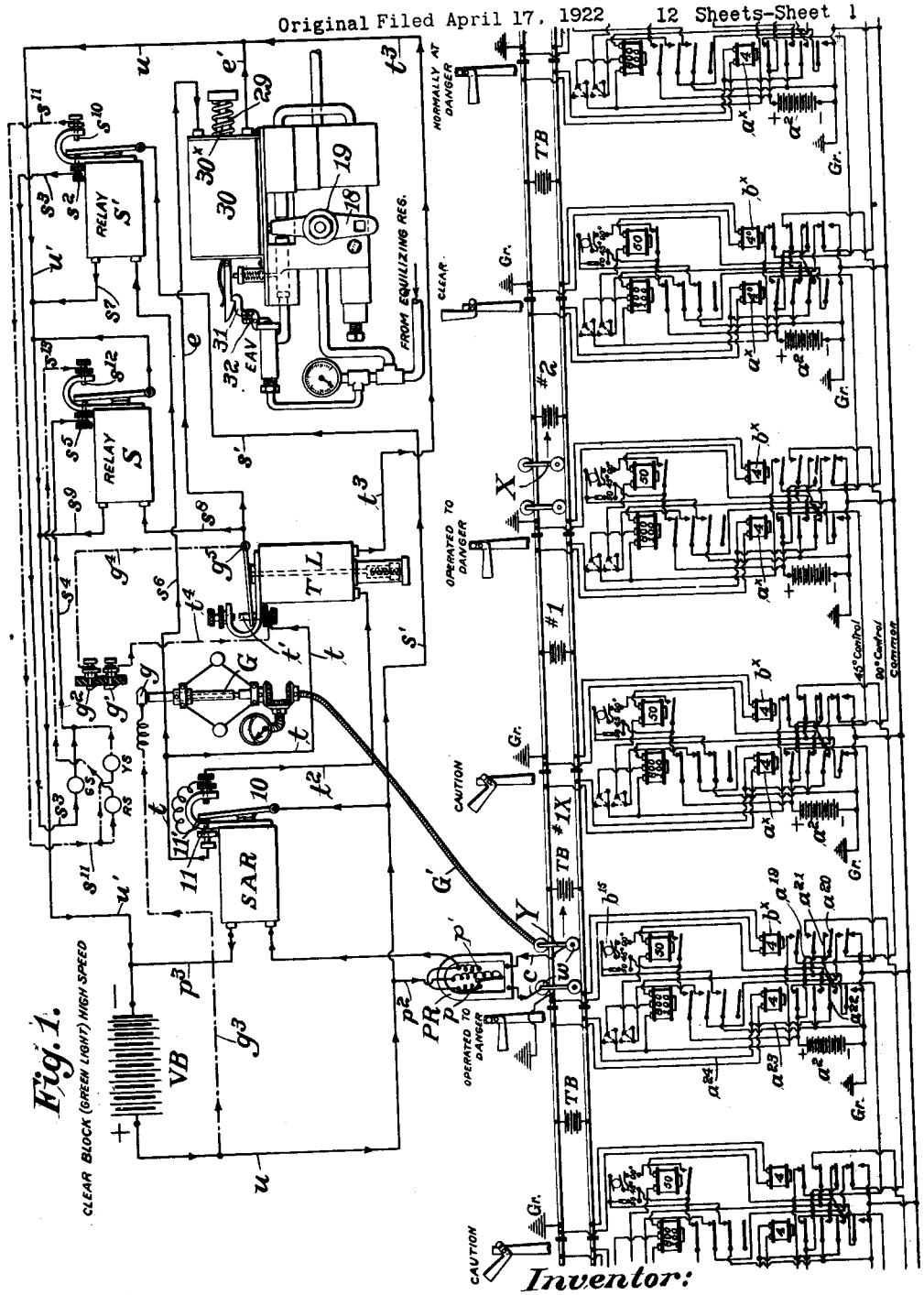

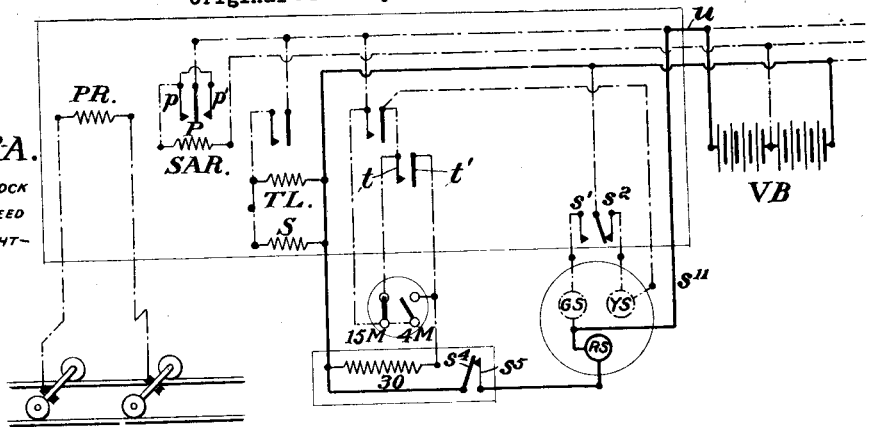
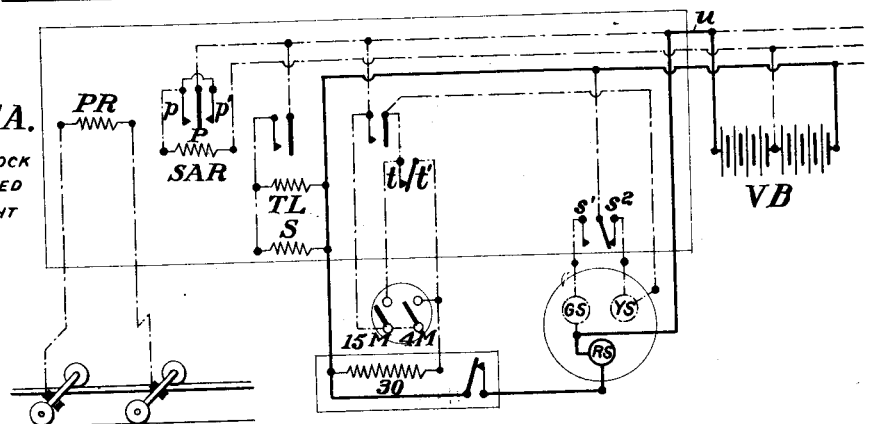
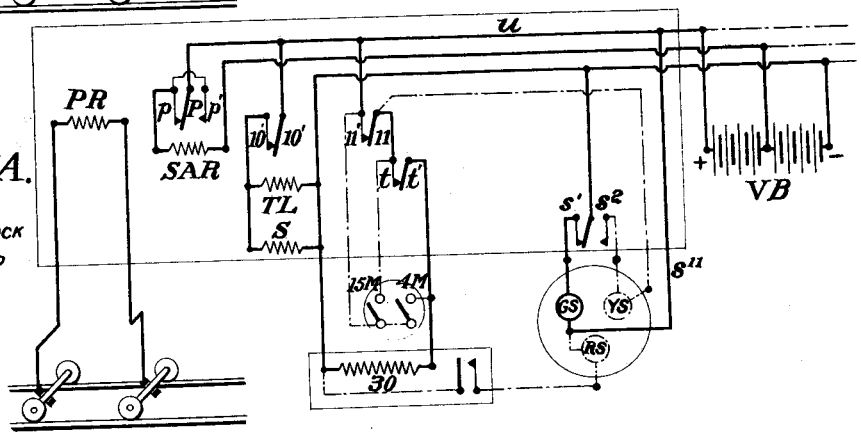

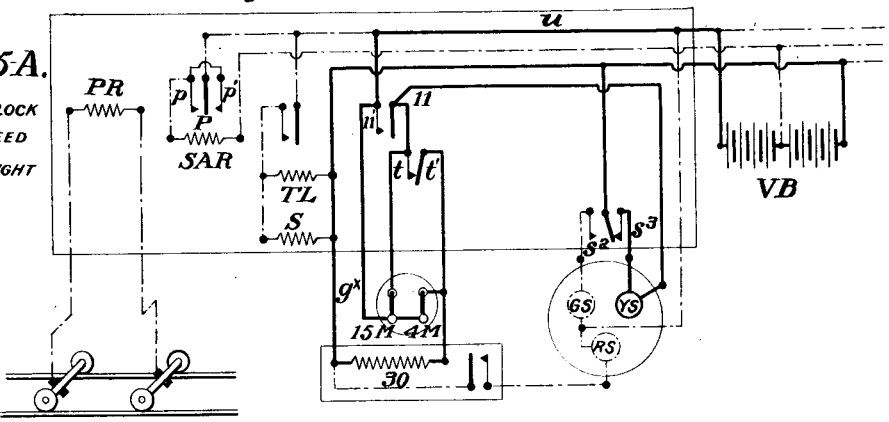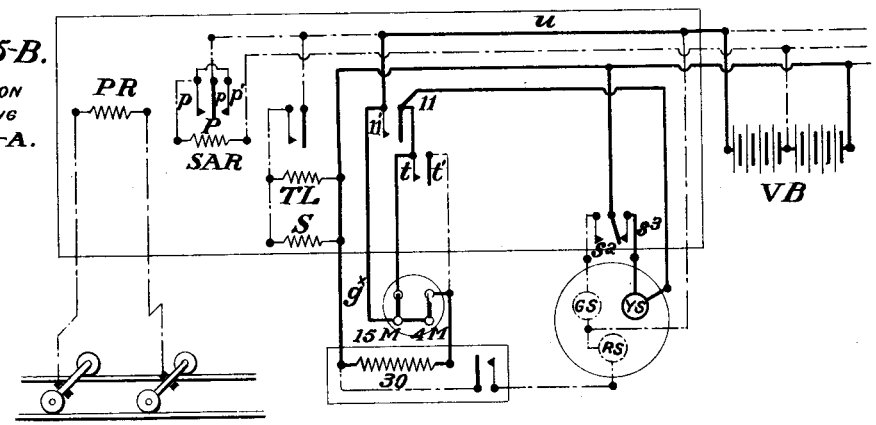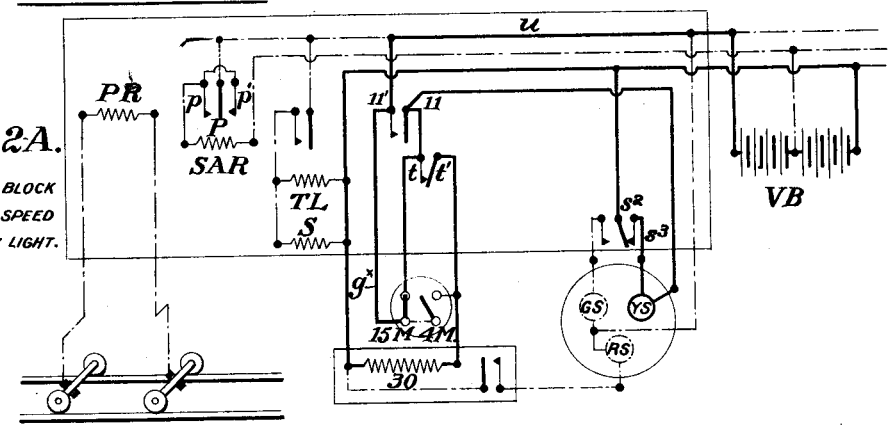

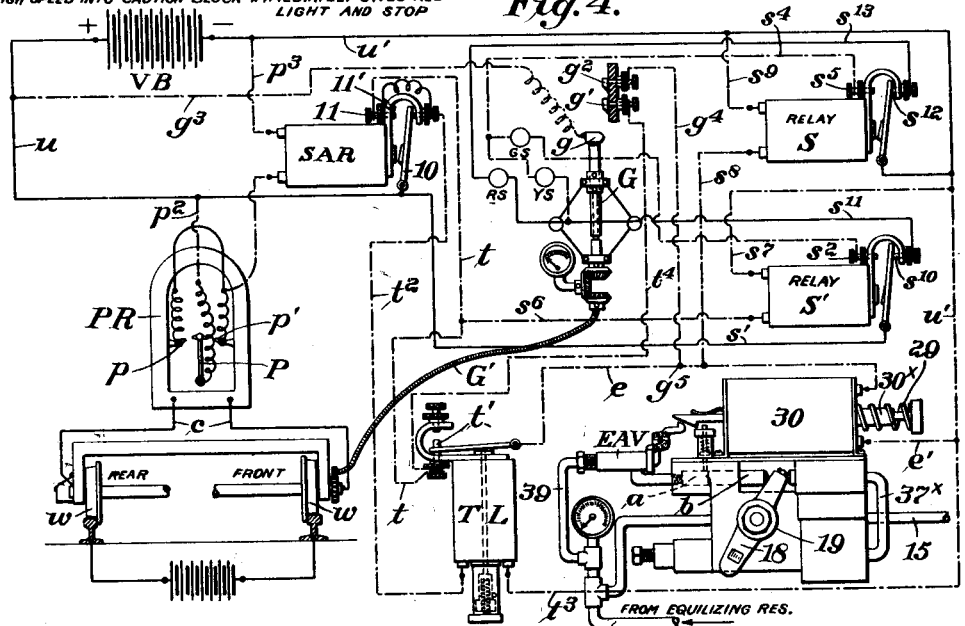
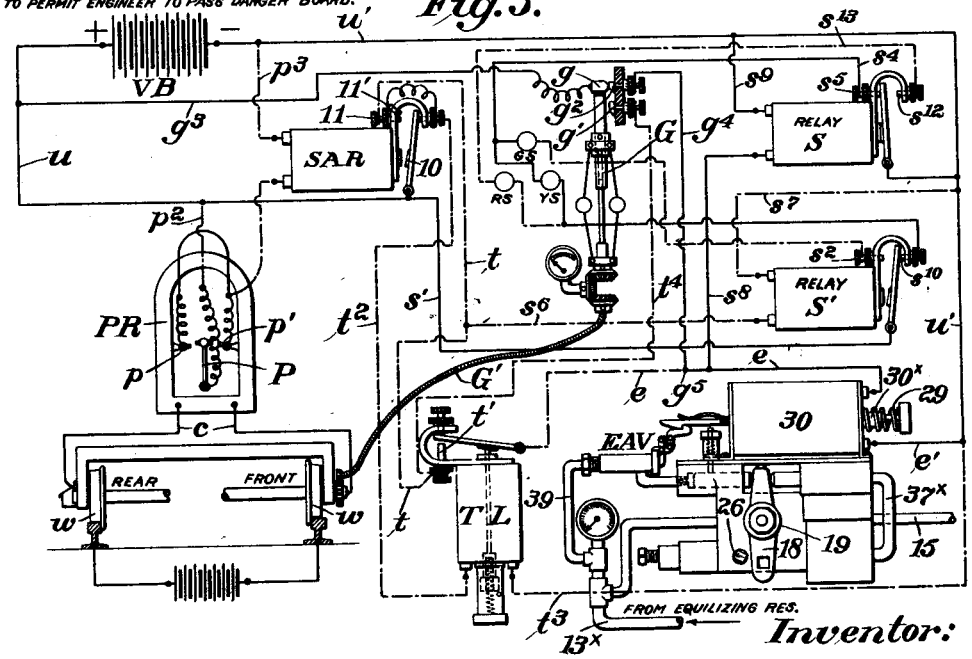

June 26, 1928.
P. J. CLIFFORD
AUTOMATIC TRAIN STOP MECHANISM
1,675,251
Original Filed April 17, 1922    12 Sheets-Sheet 6
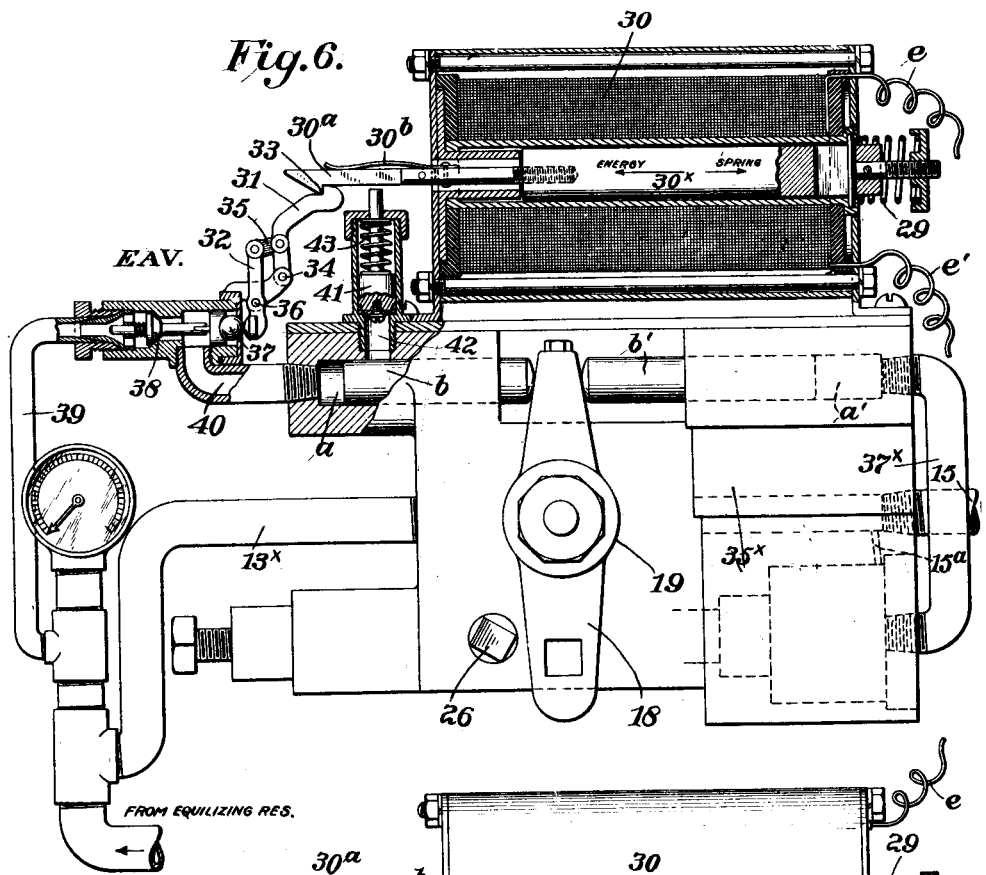
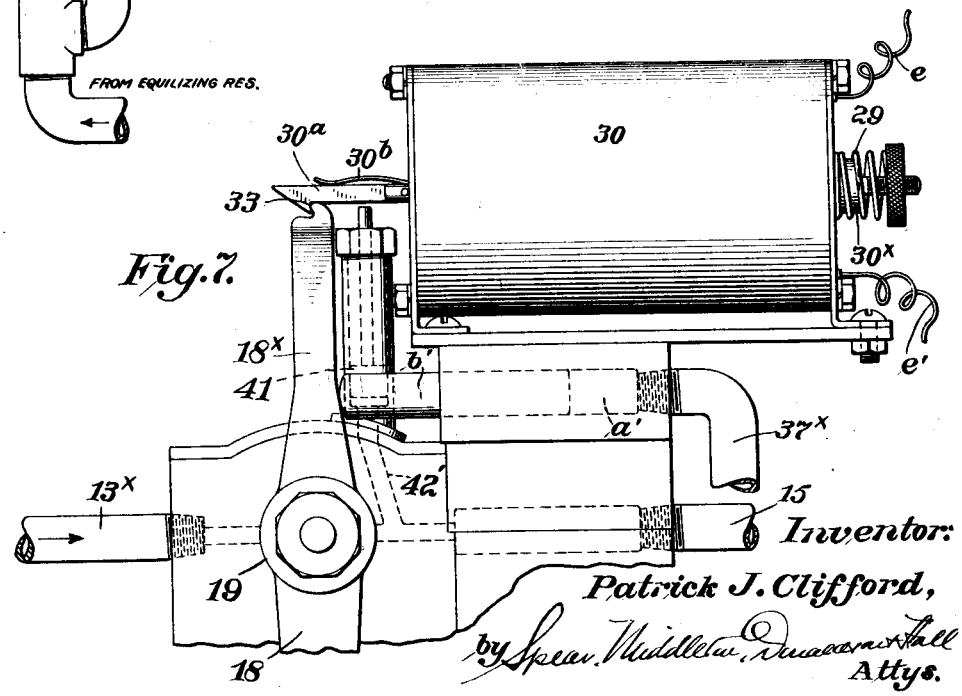
Inventor:
Patrick J. Clifford,
by Spear, Middleton, Donaldson & Hall
Attys.

June 26, 1928.
P. J. CLIFFORD
AUTOMATIC TRAIN STOP MECHANISM
Original Filed April 17, 1922   12 Sheets-Sheet 7
1,675,251
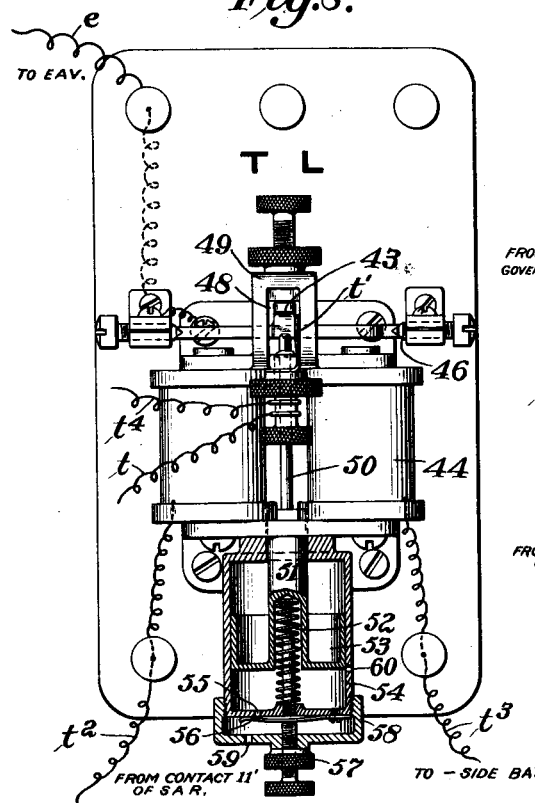
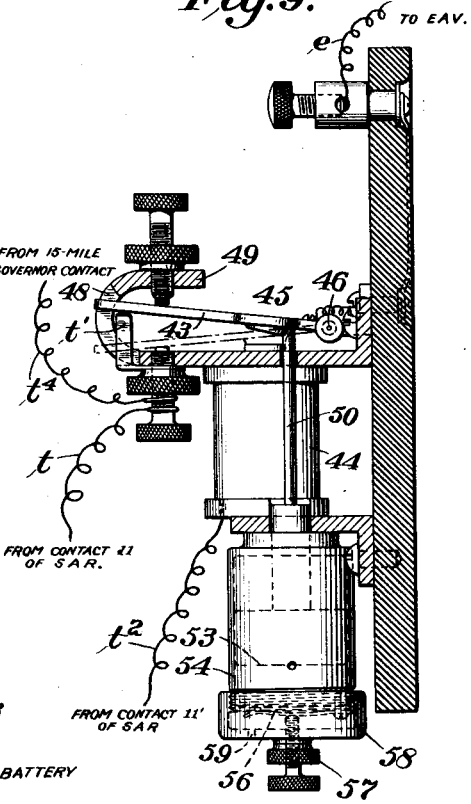
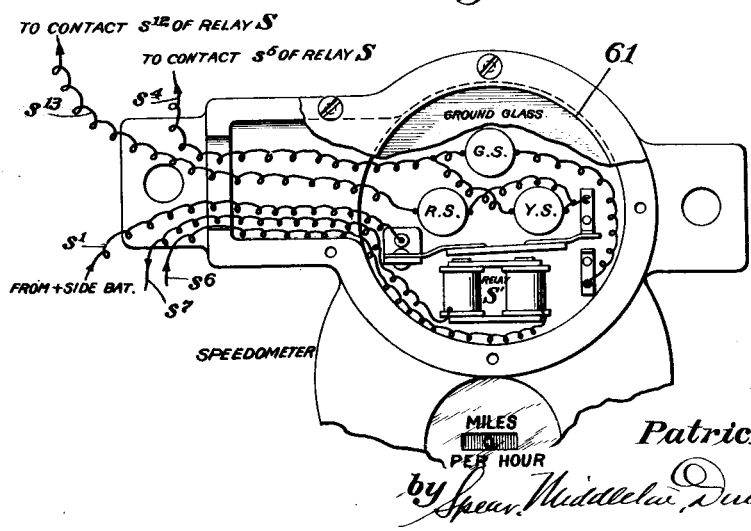
Inventor:
Patrick J. Clifford,
by Spear, Middleton, Donaldson & Hall
Attys.

June 26, 1928.

P. J. CLIFFORD 1,675,251

AUTOMATIC TRAIN STOP MECHANISM

Original Filed April 17, 1922    12 Sheets-Sheet 8

Inventor:
Patrick J. Clifford,
Attys.

June 26, 1928.
P. J. CLIFFORD
AUTOMATIC TRAIN STOP MECHANISM
Original Filed April 17, 1922   12 Sheets-Sheet 9
1,675,251
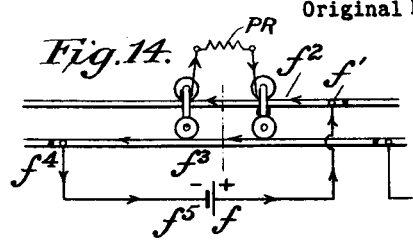
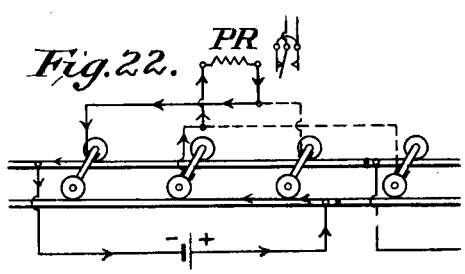
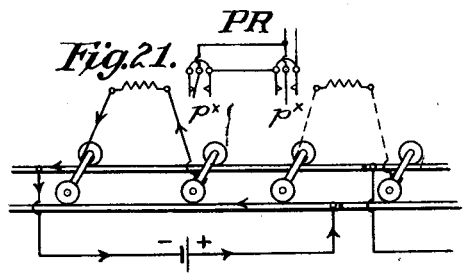
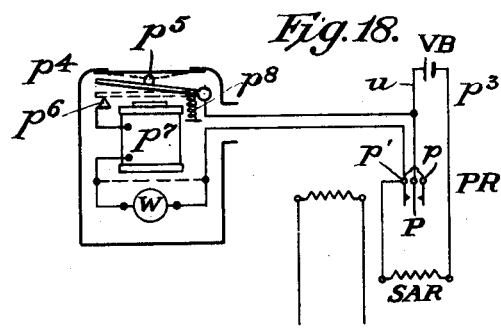
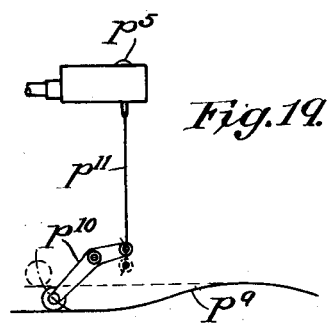
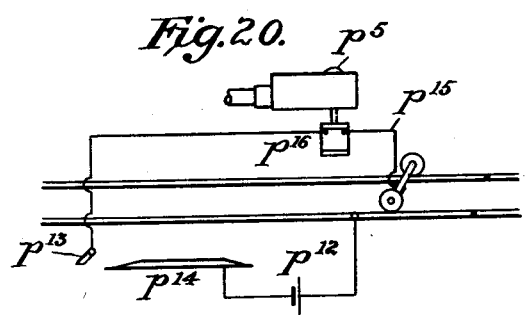
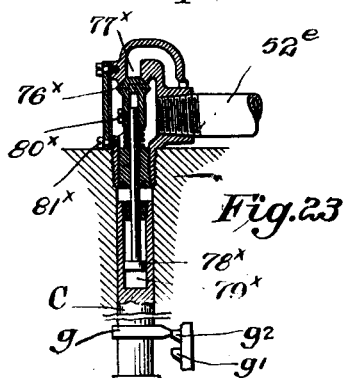
Inventor:
Patrick J. Clifford,
by Spear, Middleton, Donaldson & Hall
Attys.

June 26, 1928.

P. J. CLIFFORD 1,675,251

AUTOMATIC TRAIN STOP MECHANISM

Original Filed April 17, 1922  12 Sheets-Sheet 10

Inventor:
Patrick J. Clifford,
by Spear, Middleton, Donaldson & Hall
Attys.

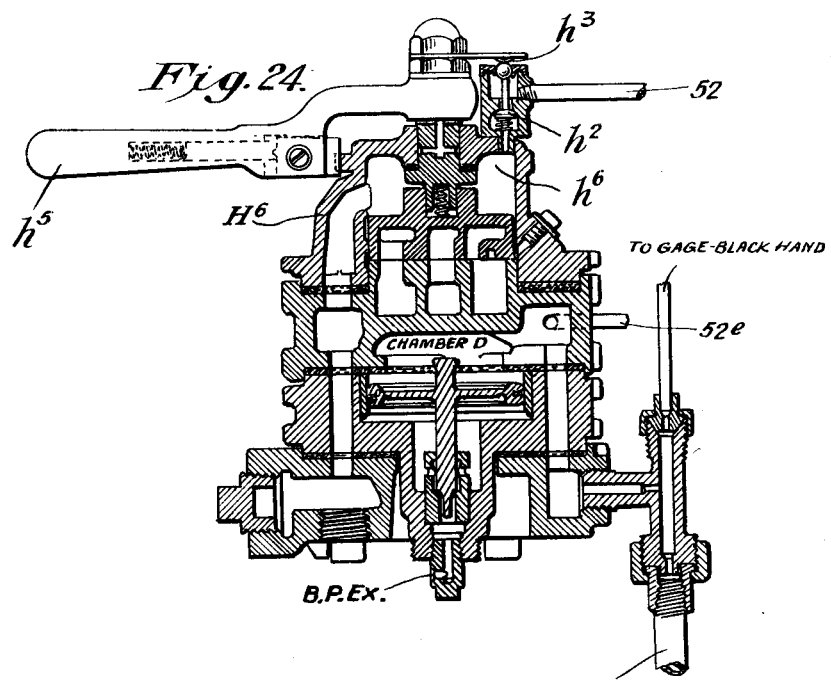
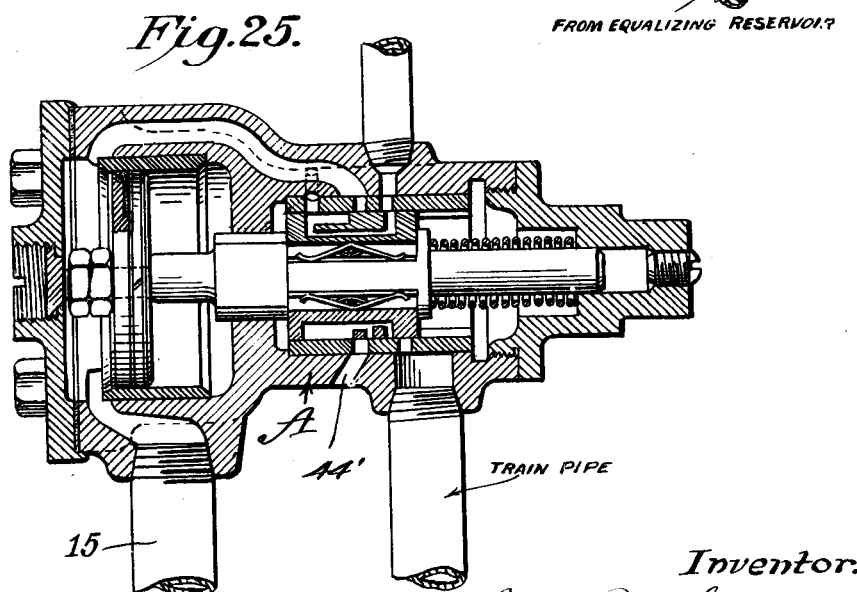

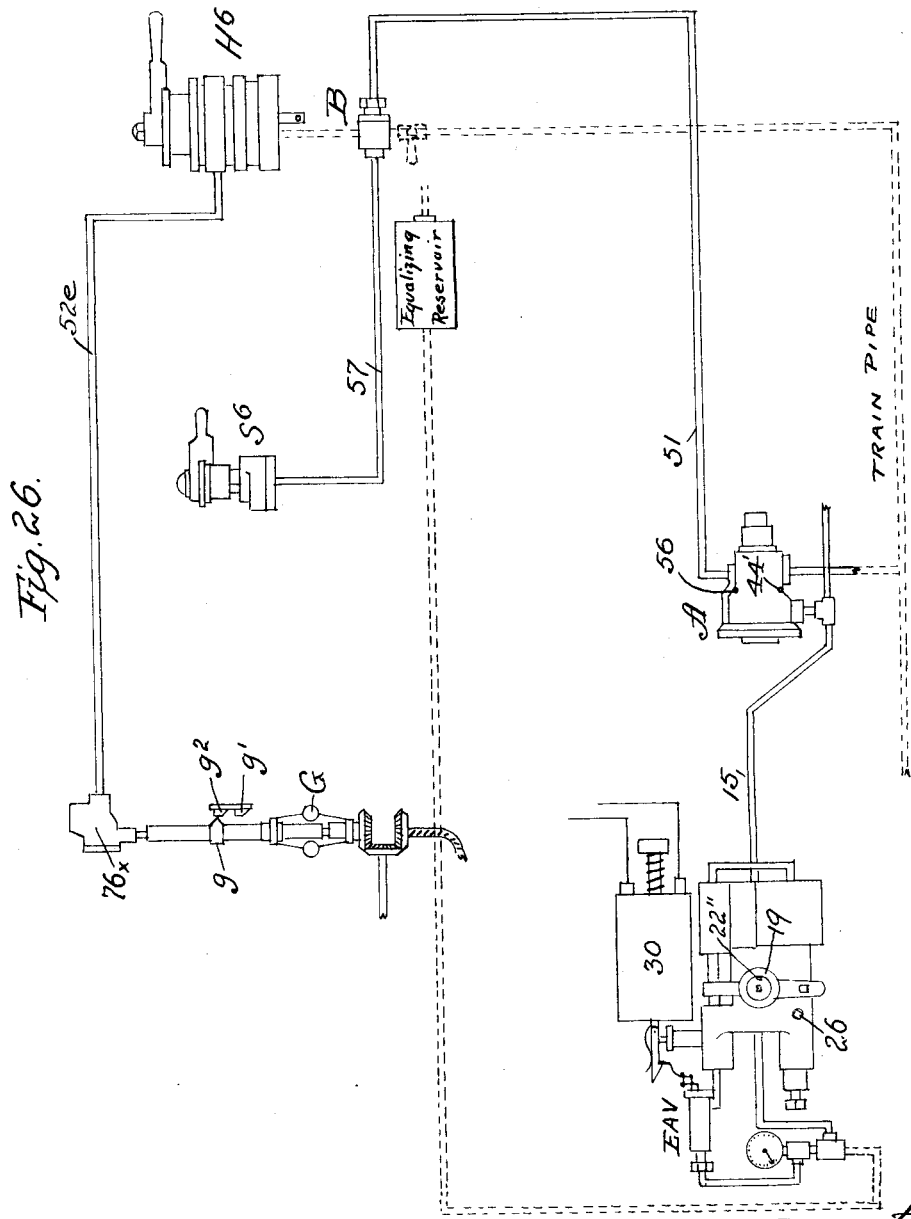

Patented June 26, 1928.

1,675,251

UNITED STATES PATENT OFFICE.

PATRICK J. CLIFFORD, OF FALLS, PENNSYLVANIA, ASSIGNOR, BY MESNE ASSIGNMENTS, TO TRAIN CONTROL CORPORATION OF AMERICA, A CORPORATION OF DELAWARE.

AUTOMATIC TRAIN-STOP MECHANISM.

Application filed April 17, 1922, Serial No. 553,429. Renewed August 17, 1927.

One object of the invention is to provide an automatic train stop or control apparatus which is mounted on the locomotive or vehicle and which will cooperate with forms of trackway signalling apparatus, or with or without parts thereof, to control or stop the train when caution or danger conditions exist.

Other objects will be clear from the following description.

In the accompanying drawings:—

Figure 1 is a diagram of the apparatus on the vehicle and of the trackway system or means with which the invention cooperates. The parts are shown under the conditions of clear block, (green light) and high speed of the vehicle.

Fig. 1$^A$ is a simpler wiring diagram, omitting certain contacts and one signal relay.

Fig. 2 is a diagram of part of the invention which is located on the vehicle, the conditions being caution (yellow light) at moderate speed.

Fig. 2$^A$ represents the same conditions as in Fig. 2 but with the modified construction of Fig. 1$^A$.

Fig. 3 is a diagram of the apparatus shown in Fig. 2, but with the time limit contact broken for an automatic stop and a corresponding signal indication.

Fig. 3$^A$ represents the same conditions as Fig. 3, but with the simplified construction of Fig. 1$^A$ which is a modification of the apparatus in respect to Fig. 1 consisting mainly in the omission of signal relay S'.

Fig. 4 is a diagram similar to Fig. 2, but under different conditions, namely: caution block and high speed giving red light and automatic stop.

Fig. 4$^A$ represents the same conditions as in Fig. 4, but with the modified construction.

Fig. 5 is a diagram representing the conditions when the vehicle is traversing a dead or caution block at a safe low speed, enabling the engineer to pass a danger signal, for instance, when he may desire to couple up with a stalled train ahead.

Fig. 5$^A$ represents the same conditions as in Fig. 5 but with a modified diagram.

Fig. 5$^B$ represents the second stage, following Fig. 5$^A$.

Fig. 6 is a detail view partly in elevation and partly in section of the EAV valve, the trigger valve, and solenoid and adjacent parts.

Fig. 7 is a modification of the arrangement shown in Fig. 6.

Fig. 8 is a detail plan view of the time limit relay partly in section.

Fig. 9 is a vertical sectional view of the parts of Fig. 8 with parts in elevation.

Fig. 10 is a view of a convenient assembly of the cab signals with one of the signal relays.

Fig. 14 is a diagram of the manner of connecting a battery to the ends of the rails of a block.

Fig. 18 represents means for preventing an auto-brake application when running over a fouling point, or into a zone which is not electrically equipped.

Figs. 19 and 20 show automatic means for carrying out the functions of the devices of Fig. 18.

Fig. 21 illustrates a primary relay PR, located on the vehicle.

Fig. 22 is a modified form of the primary relay on the vehicle.

Fig. 23 is a view of predetermined high speed control means.

Fig. 24 is a sectional view of the engineer's valve H$^6$ (Westinghouse type).

Fig. 25 is a view of an automatic air release valve.

Figure 11:
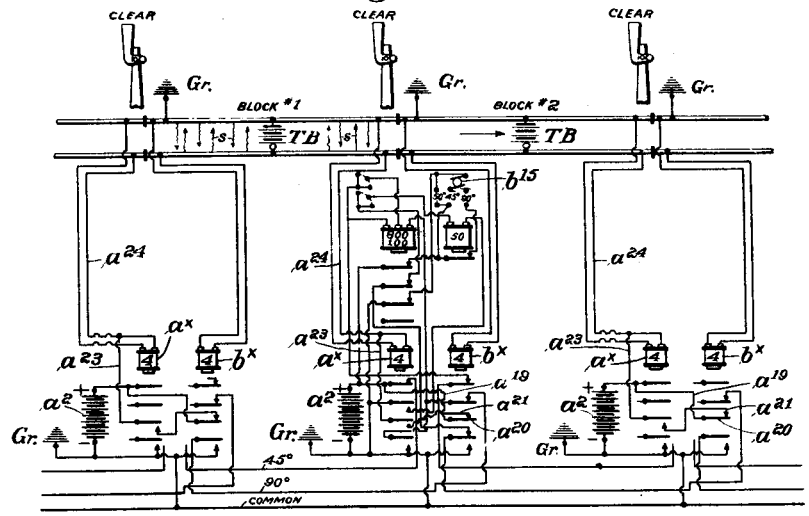
Figs. 11, 12 and 13 are views of a signalling system with which my invention may be combined, these pertaining to the same wiring as in Fig. 1.

Fig. 26 is a diagram illustrating the solenoid 30, EAV valve, trigger valve, automatic air release valve A, engineer's disabling valve B, the engineer's automatic brake valve H$^6$, and straight air valve S$^6$, the governor G, speed control valve 76$^x$ and equalizing air reservoir with connections between them. This diagram is to supplement the showing in the previous diagrams, the solenoid 30 appearing in the other diagrams as well as the present one.

I employ an electric air valve controlling the air supply to an automatic brake applying apparatus, which in part may be like that disclosed in application No. 284,731, filed Mar. 24, 1919. This valve marked EAV Fig. 1, is normally closed and therefore air is normally cut off from the air brake apparatus. When this valve is opened, air pressure will be delivered to the engineer's disabling valve B, Fig. 26, and the automatic air release valve A of the above mentioned application, and an air release port, 44', Figs. 25 and 26, will be opened to allow escape of train line air for setting the brakes. This valve is controlled by a solenoid 30 and by a spring 29, which is under compression when the solenoid is energized. So long as the solenoid is energized the valve EAV will remain closed, but when current is absent from the circuit which includes this solenoid, the valve then will be opened by spring 29. When the valve EAV is opened, the brakes will be applied, as will be hereinafter described.

The energizing or deenergizing of the circuit in which the solenoid of the EAV valve is included is dependent upon (1) the electrical conditions in the tracks due to conditions existing in the trackway signalling system, or in such parts thereof as may be used by me, and (2) to the speed of the train.

The details of the EAV valve and the mechanism for immediately operating it will be described hereinafter.

This EAV valve, together with the whole train stop apparatus controlled thereby, is located on the train.

I do not limit myself to the use with my apparatus of trackway signal systems in their entirety, for, as will be made clear hereinafter, signals may be installed on the locomotive which will do all that standard trackway signals now do and hence with my apparatus installed on a train, some parts of the trackway signal systems may be omitted and only enough of said systems need be employed which determine the energizing or deenergizing of the rails of the blocks to make them dead electrically or active, according to the conditions in the blocks ahead or to the operativeness of the said trackway apparatus.

My invention includes the primary relay PR, the relay SAR, the locomotive cab signal relays S, S', a time limit relay TL, and governor means, indicated generally at G, all of said parts being on the vehicle. The relay PR is designed to be controlled by prescribed conditions in the block being traversed by the train, and said relay initially controls the mechanism on the train. The changes in the potential of the track under different conditons of traffic may be obtained in various ways. I have referred hereinafter to the rails of a certain block as being dead while the rails of a clear block are referred to as "energized," but these terms may be regarded in a relative sense in that electrical potential may exist in the rails of a caution block but may not be sufficient to hold the armature of the primary relay of the vehicle traversing this block. In any case, when we refer to a dead block hereinafter, we mean a block which does not have electrical potential at all, or in which the electric potential is not sufficient to hold the relay on the vehicle in such condition as to maintain the apparatus thereon out of operation.

I will disclose hereinafter ways in which changes in the electrical conditions in the block may be secured, to accord with the conditions ahead.

The primary relay PR is a polarized relay and is in a low resistance circuit wire $c$ running for instance from the right hand side of the frame of the locomotive at the front thereof to the left hand side of the frame at the rear, and getting its current through the wheels $w$. This polarized relay PR may be organized to be operative even under a weak current, and its contacts are always closed when current is passing through the wire $c$. When this relay PR is closed, the other relays SAR and TL are energized, and current then exists in the solenoid 30 controlling the EAV valve, and this remains closed and the brake apparatus is in normal position, i. e., out of action.

*Operation under conditions with train standing on one block and another train approaching.*

When train X stands in block #2, Fig. 1, relays $a^x$ and $b^x$ of the trackway signal system of the block #2 will open because train X will have shorted the track battery of this block and deenergized the coils of relays $a^x$ and $b^x$. The dropping of the armatures of these relays $a^x$ and $b^x$ will prevent the existence of current in the rails of block #1 such as will hold the relay PR in normal position, and the rails of this block will be virtually dead, that is the condition of this block will then be such that the primary relay PR on the vehicle will reverse its position, as will be more fully described hereinafter.

Suppose train Y is now approaching block #1, as in Fig. 1. The signal board at the entrance to the block #1 will be at caution. Before it enters this block the armatures of all the relay magnets PR, SAR, TL and S, S', will be in their closed positions, because current will pass from rails, through car frame, wire $c$, and through relay PR. The circuit to the solenoid 30 controlling EAV valve will be energized and said valve will be held closed, and the brakes off, as will be hereinafter described. The engine cab signal will be green. The immediate circuit controlling the solenoid 30 of the EAV valve will be as shown in Fig. 1; from battery VB, wire $u$, armature 10 of relay SAR, contact 11, wire $t$, contact $t'$ of time limit relay TL, wire $e$, solenoid 30 of EAV control, wire $e'$, and wire $u'$ back to battery VB. This condition will exist at all speeds while the vehicle is on a clear block.

The green signal in the cab under these conditions will be lighted, the circuit thereto being from plus side of battery VB, line $u$, $s'$, closed armature of relay $S'$, contact $s^2$, wire $s^3$ to GS (green signal), and thence by wire $s^4$, contact $s^5$, armature of relay S to line $u'$ to minus pole of the battery VB, Fig. 1.

To establish the signal circuit, the armatures of both relays S, $S'$ are closed, i. e., drawn by their poles against front contacts $s^2$ and $s^5$ and for this purpose the energizing of the coils of these relays is due to the closing of armature 10 of relay SAR upon contact 11, as above set forth, and also due to the closing of armature of relay TL, upon its contact $t'$. These coil energizing circuits are traced as follows: For coil of $S'$ the circuit will be from plus side of battery VB, wires $u$, armature 10, contact 11, part of wire $t$, wire $s^6$, coil of $S'$, wire $s^7$ to line $u'$ to minus side of battery VB.

For coil of S the circuit will be the same as that just described up to and including wire $t$, thence it will be through contact $t'$ of relay TL, the armature of this relay, wire $s^8$ to coil of relay S, and thence by wire $s^9$ and line $u'$ to minus side of battery. The coil of relay TL will have been energized through contact $11'$ of relay SAR, wire $t^2$ to coil of TL relay and thence by wire $t^3$ to line $u'$ to minus side of battery VB. It will make no difference what the speed is for the ultimate result will be the same whether governor contact $g$ is moved to its off position or high speed, as shown in Fig. 1, or is engaging the 15 mile speed contact $g'$ or the 4 mile speed contact $g^2$, because under the conditions mentioned with the train travelling on a clear block, the armatures of all the relays will be closed.

I may state here that the polarized or other relay PR, has two contacts $p$, $p'$, and when the prescribed potential exists in the rails and passes through this relay the armature P is engaging with either one of these, and in either case the circuit will be maintained from plus side of battery VB, wires $u$, $p^2$, armature P, contact $p$ or $p'$ to coil SAR and by wire $p^3$ to minus side of VB.

*Train running at moderate speed within quick control.*

We will now suppose that the train is running at a speed well within control, or in other words, such a speed as will enable the engineer to quickly stop the train if he is observant, and stands ready to apply his brakes. Such a speed would be, say, 15 miles an hour.

As shown in Fig. 2, the governor G which is adjusted automatically by the speed of the train through flexible shafting $G'$ will have set itself so that the electric contacts $g$, $g'$ of the governor will be closed.

Now when the train Y enters caution block #1 at the control speed stated, say 15 miles an hour, the relays function as follows, owing to absence of the prescribed current potential in the rails of this block, relay PR will open by its contact P, moving away from contact $p$ to neutral position, and as coil of relay SAR is in the same circuit with these contacts P and $p$ and with battery VB through wires $u$, $p^2$, $p^3$, this coil of SAR will be deenergized and this relay will open by its armature 10, moving away from the pole of said coil, and as this breaks the contact at 11, the coil of engine cab signal relay $S'$ will be deenergized. This coil is controlled by the circuit traced above. The deenergizing of coil $S'$ releases its armature and changes the cab signal from green, clear, to yellow, caution. This yellow signal circuit which is brought into action by the deenergizing of relay $S'$, at the same time cutting out the green signal, may be traced as follows: From plus side of battery VB, wires $u$, $s'$, to armature of relay $S'$, back contact $s^{10}$, wire $s^{11}$, to signal GS, wire $s^4$, contact $s^5$ of relay S, armature of said relay to line $u'$, back to minus side of battery VB.

At the same time that this yellow signal is displayed, and as a consequence of deenergizing of the relay SAR, the time limit relay TL will be deenergized and its armature or core will go gradually from closed position to open position, this after a prescribed time interval has elapsed opening the contact at $t'$, so that the circuit of the EAV valve will be broken and its solenoid deenergized, allowing the spring 29 to operate and by moving the core $30^x$ of solenoid 30 the levers 31, 32 will be operated to open the EAV valve and allow air to operate the trigger valve 19 to supply air to the brake apparatus for applying the brakes and stopping the train. This time interval which it takes for the contact at $t'$ to open is of such duration that with the train running at say 15 miles an hour or under, down to say 4 miles an hour, the train Y will traverse a prescribed distance into block #1, say ⅞ thereof, before being brought to a stop automatically, as just described, but this distance may be more or less according to adjustment of TL. The conditions just described will persist so long as the engineer continues to run at the prescribed slow speed during this time interval stated. Should he attempt to increase speed, the governor G will shift and the circuits then will be arranged to open the circuit of solenoid of EAV valve and allow said valve to open and set the brakes, as will appear in connection with the description of the conditions obtaining at a speed above 15 miles an hour.

At the same instant that the brakes are applied automatically, as just described, by reason of the engineer allowing the train to traverse more than 7/8 of the block at the control speed of 4 to 15 miles an hour, or by him speeding up during the time interval, relay S will release its armature from closed to open position, Fig. 3, thus changing the cab signal from yellow to red, indicating a stop.

This showing of the red signal indicated at RS is due to the fact that the train has been running at 15 miles an hour and that it has entered block #1 with a train standing on the block #2, and has traversed more than the prescribed distance in said block, i. e., or that it has speeded up above 15 miles an hour during its traverse of the 7/8 distance. The circuit in which coil of relay S is located may be traced as follows: plus side of battery VB, wire $g^3$, governor contacts $g$ and $g'$, which are set, by the governor, in engagement when the speed is 15 miles an hour, where $t^4$, contact $t'$ of the TL relay, wire $s^8$, coil of S, and wire $s^9$ and $u'$, back to the battery VB. It will thus be seen that when running at 15 miles an hour, and with either a clear block ahead, or within the caution zone, the circuit will be established at $g$, $g'$, and at $t'$, and armature of relay S will be held in closed position and the red signal RS will be off, but if this same speed is maintained beyond the time limit and therefore contacts $g$, $g'$ remain connected, the breaking of time limit contact at $t'$, will open circuit just described, deenergizing relay coil S and allowing armature of S to assssume open position, i. e., against back contact $s^{12}$, this cutting in the red signal with battery VB, as shown in Fig. 3.

This red light circuit may be traced as follows: From plus side of battery VB, wires $u$, $s'$, armature of S', back contact $s^{10}$, wire $s^{11}$, signal RS, and wire $s^{13}$, back contact $s^{12}$ of relay S, armature of said relay, wire $u'$ to minus side of battery VB.

It will now be understood that with the train running at a speed, say, 15 miles an hour, well within the control of the engineer to stop quickly, the engineer can run past a caution board into the dead block next to the occupied block, but should he fail to act and stop the train as he nears the danger board of the occupied block, the control will be taken out of his hands and the train will be stopped automatically after it has traversed, say 7/8 of said block, and reached a point beyond which it would be dangerous to proceed. This point is determined by the automatic device consisting in the present instance of the time limit relay TL, but I do not limit myself to this kind of device as an automatic controller.

*Above 15 miles an hour.*

Now suppose train Y should enter block #1 against which the caution board is set at a greater speed than 15 miles per hour, the sliding governor contact $g$ will be pulled down by the governor balls to a point where it will not close any circuit, as in Fig. 4, hence circuit $g^3$, $g$, $g'$, $t^4$, $t'$, $e$, solenoid 30, $e'$, $u'$ and battery VB will be open at $g$, $g'$, this being the circuit controlled by the time limit relay TL, and hence when the relay SAR opens due to the opening of relay PR, when the train enters the deenergized block #1 at high speed, the circuit of battery VB, i. e., $u$, 10, 11, $t$, $t'$, $e$, solenoid of EAV, $e'$, $u'$, back to the battery, will be broken at relay SAR, and hence valve EVA will be opened due to deenergizing of its controlling solenoid 30, and air will be supplied to apply the brakes, at once.

It will thus be seen that if the train is running above 15 miles an hour and the engineer fails to operate his valve to reduce speed, when a caution board is set against him the train will be brought to a stop by the primary action of relay PR which opens, and cooperating with the governor G breaks the circuit of solenoid of valve EAV, without waiting for the time limit relay TL to operate, which now can do so only ineffectively.

The time limit relay will still perform its function in so far as its coil is deenergized and in so far that it operates slowly to break the circuit at $t'$, but this breaking of the circuit will have been anticipated by the breaking of the circuit at contact 11 of the SAR relay, so that the circuit of the valve EAV is broken quickly and as soon as the train enters the deenergized block #1, instead of, as in the case first described, after the train has traversed, say, 7/8 of the block.

As a matter of fact, under high speed the governor G cuts out the time limit relay by breaking the circuit at $g$, $g'$, and therefore as soon as the circuit controlled by relay SAR is broken by the deenergizing of the coil thereof, the EAV valve will open and the brakes will be applied.

*Low train speed of, say, 4 miles an hour.*

Suppose train Y enters dead block #1 at a low speed, say 4 miles an hour, the governor sliding contact $g$ will engage contact $g^2$ and despite the fact that primary relay PR and also SAR and TL, may open, the circuit to solenoid 30 of EAV will remain unbroken and no automatic brake application will take place, but the train will be allowed to proceed at 4 miles an hour to the next red board, see Fig. 5.

The circuit thus established may be traced as follows: battery VB, wire $g^3$, governor contacts $g$, $g^2$, wire $g^4$, to wire $e$ at point $g^5$, solenoid 30 of valve EAV, wire $e'$, and back to battery by way of wire $u'$.

At the same time the coil of cab signal light relay S will be energized through branch from $g^4$, through wires $s^8$, $s^9$, and $u'$ back to battery. Coil of relay S' will be deenergized by the breaking of circuit at relay PR, due to the electric potential conditions of the rails and consequent breaking of contact at 11 of deenergized relay SAR. Armature of relay S' will then engage back contact $s^{10}$, and the yellow signal circuit will be established as heretofore traced.

Résumé.

It will be seen from the above that at a certain moderate speed at which the train is well within control of the engineer, say fifteen miles an hour, the final determining factor in deenergizing the circuit to solenoid of valve EAV and the application of the brakes is the opening of time limit contact $t'$, of the time limit relay TL, because despite the fact that relay SAR as well as relay RP is open, the said circuit of the EAV solenoid will remain closed so long as time limit contact $t'$ is closed, because the circuit will be completed through the governor whose sliding contact $g$ is engaging $g'$ when the train is running at fifteen miles an hour, but this condition will not persist indefinitely, but only long enough to allow the train to run by the caution board for about ⅞ of the length of the block, whereupon the time limit relay TL will have assumed a position with contact at $t'$ open and the train therefore will be stopped by breaking the circuit leading to the solenoid of the EAV valve.

Under high speed the governor sliding contact $g$ will be down out of engagement with either contacts $g'$ or $g^2$ and as soon as relay SAR opens them, as no branch circuit connection is established at the governor leading to contact $t'$ of the time limit relay, the breaking of the circuit by armature of relay SAR will deenergize the solenoid of valve EAV and this valve will open to supply air to the apparatus for setting the brakes.

At low speed, of, say, four miles an hour, the EAV valve is prevented from opening, despite the fact that all of the relays may open on running into a caution or danger block because the governor establishes a maintaining circuit through sliding contact $g$ and contact $g^2$ as above described which keeps the EAV valve closed.

It will be understood that in my present system there need be no eliminating valve controlled from the engineer's valve such as in application No. 284,731, because the governor takes care of the conditions at high, moderate or low speed, automatically. Where, as in my previous application No. 284,731, a trigger valve is employed together with an eliminating valve which is closed to eliminate automatic braking by the same act of the engineer, i. e., operating his big brake valve ($H^6$ of the Westinghouse system), the engineer must observe the operation of the trigger valves, to ascertain when he has passed the ramp, shown in said application, so that he may know when he may safely return his brake handle to running position. He can ascertain this in the apparatus of said application by observing when the lever 18 of said valve 19 is unlocked by the built up pressure and has returned to normal position, or other signal means may be operated by the said trigger valve when this returns to normal position to indicate to the engineer that the ramp has been passed. In the present case no ramp is used and no eliminating valve. In fact no independent system need be used on the trackway in addition to the trackway signalling system, modified as may be necessary to give the desired prescribed electric potential conditions of the rails under the different conditions of clear, caution and danger.

The relay PR is provided with the second contact $p'$. The armature P when released goes to zero, half way between the contacts $p$ and $p'$, and the second contact $p'$ is provided in order to take care of a change in polarity in the current passing through the coil of this relay from the tracks. It will be noted that whether the armature of relay PR be normally on contact $p$ or $p'$, the effect will be the same, as both of these contacts are connected with the same wire, but when the armature is released in either case it will assume a position midway between these contacts.

The signals in the cab are of importance. They will be displayed independently of the trackway signals in the sense that they are not dependent upon the trackway signals. They will not be affected by weather conditions and they enable the outside signals to be checked up and their accuracy ascertained.

The signal lights in the cab will be yellow, green and red.

When train enters the dead block #1 at a control speed of fifteen miles an hour the signal light will change from green, clear, to yellow, caution. If the train continues running for, say, ⅞ of the block at this speed, the light will change from yellow to red, and indicate an automatic stop.

If engineer should increase speed above fifteen miles an hour after entering dead block #1, then he would get an immediate application of the brakes, and red indication.

If he enters block #1 at a speed greater than fifteen miles an hour, then the light would be red the instant he passed the caution board, and a brake application would be given simultaneously with the display of the red light.

If below fifteen miles an hour, say, four miles, then a yellow light would show and EAV valve would be closed through governor 4 mile contact, to permit engineer to proceed at this speed.

If engineer now increases speed above this prescribed low speed, assuming that the TL valve has worked out, he will get red light and brake application, because the 4 mile contact $g^2$ on the governor will be broken and contact $t'$ having already been broken, there will be no current to solenoid of the EAV valve to hold it closed.

It will be clear from the above that the vehicle cab signals may take the place of the trackway signals, and only so much of the trackway signal apparatus be used in my system as to make the electric condition in the rails accord with the conditions of clear, caution or danger conditions in the blocks.

It will be seen further, that my signals may be the result not only of the electrical conditions in the rails being traversed, but also of the speed of the train and also, under certain conditions, of the distance the vehicle proceeds into the block. This is true also of the brake applications.

Referring briefly to the diagrams, Fig. 1 represents the conditions in the system, carried by the vehicle, when running in a clear block whose rails are energized and with the speed above the moderate prescribed speed of, say, 15 miles an hour.

All the relays on the vehicle are closed on their front contacts, all governor controlled circuits are broken, current goes from closed contact 11 of relay SAR to energize time limit relay TL and keep it from operating and from contact 11' through closed contact $t'$ of time relay TL to solenoid coil of EAV valve to hold this valve closed and the brakes off. The green light will be on because both relays S, S' are closed, i. e., because their armatures are engaging their front contacts. Certain connections which are idle during the persistence of the above conditions are indicated in dotted lines. One of these is the connection $t^4$ leading from the 15 mile contact $g'$ to supply current through time limit contact $t'$ to EAV coil 30 when current from contact 11 of relay SAR is not available, for instance, when traversing a dead block at 15 miles an hour. Another idle connection is the wire $g^4$ which leads from 4 mile contact $g^2$ for keeping the coil of EAV solenoid energized when travelling a dead track at 4 miles an hour, to thus hold the brakes off. Other connections out of service under the conditions noted are the connections to the signals YS (yellow) and RS (red), as the former is active only when armature of relay S' is against its back contact $s^{10}$ and armature of S against its front contact $s^5$, and the latter (red) is active only when armatures of both relays S, S' are against their back contacts.

Fig. 2 represents the condition of the vehicle's apparatus when traversing the prescribed length, say, ⅞ of a caution block, whose rails are virtually deenergized, and at, say, control speed of 15 miles an hour.

Here relays PR and SAR are out of service, as well as all circuits controlled thereby. Armature of relay TL is moving gradually along elongated contact $t'$ so as to eventually open the circuit here when the ⅞ of the block has been traversed by the vehicle. This circuit is established through 15 mile contact $g'$ and governor contact $g$, and until it is broken at $t'$ by the time limit relay the circuit from battery VB through $g$, $g'$ and $t'$ will be maintained to the coil of solenoid of EAV valve. Until the time limit expires relay S will remain energized from this same connection, i. e., through governor contacts and contact $t'$ and the diagram Fig. 2 shows this condition and the yellow light is on. As soon as contact at $t'$ opens, however, solenoid of EAV will be deenergized, valve EAV will open and the brakes will be applied. Relay S will be deenergized, and relay S' having already been deenergized, the yellow light will go out and red light will go on.

This diagram Fig. 2 also indicates certain inactive circuit connections in dotted lines.

Diagram Fig. 3 represents the conditions immediately following Fig. 2, provided the speed of the train has been maintained at the moderate control speed prescribed, say, 15 miles an hour, until the train has completed its traverse of the prescribed distance in the dead block, say, ⅞ of its length. This represents all the relays as having opened, the circuit to EAV valve broken to secure an application of the brakes, and the red signal RS on.

Fig. 4 represents the condition when the train runs into a dead or caution block at high speed. Here all relays are deenergized. All circuits controlled by the governor are open, and the red signal is on. Here all the circuits are dead, as indicated by the dotted lines, excepting the circuit which includes the red signal, which is shown in full lines.

Fig. 5 represents the conditions when the vehicle in traversing a dead or caution block at the safe low speed of, say, 4 miles an hour. All relays are open excepting signal relay S, and the yellow signal is on. EAV valve remains closed because circuit thereto from battery VB is closed through low speed governor contact $g^2$ and the train can continue at this low speed. If, however, the speed is increased, then governor will break contact $g^2$ and as this now is the sole control of the circuits to solenoid 30 of EAV valve and signal relay coil S, these will be deenergized and a brake application will result and the signal will change from yellow to red, because both relays S, S' will now be open.

Referring to Figs. 1A to 5B showing a simplified wiring diagram, the different conditions are as follows:

Relay S' is omitted.

Fig. 1A, clear block, any speed, all relays and solenoid are energized.

Path of control current: Current from the axles of train passes through relay PR and closes circuit between contacts $p$ and P or $p'$ and P, battery VB and relay SAR, relay SAR closes contacts 10' and 10'' and allows current from battery VB to pass through conductor $u$, contacts 10', 10'', relays TL and S, to minus of battery.

Path of main current: Plus of battery VB, conductor $u$, contacts 11', 11, contacts $t$ and $t'$, solenoid 30, and back to minus of battery. Note: Closing of 15 mile and 4 mile contacts does not affect passage of current through solenoid 30.

Path of signal current: Plus of battery VB, conductor $s^{11}$, green light GS, contacts $s'$ and $s^2$, back to the minus of battery VB.

Fig. 2A, caution block, (yellow light) moderate speed at or below 15 miles per hour.

First stage, i. e., preceding the condition of Fig. 3A,—time relay contacts $t$, $t'$, are closed, 15 mile contact is closed, 4 mile contact is open, relays PR, SAR, TL and S are deenergized, solenoid 30 is energized.

Path of main current is: Plus of the battery VB, conductor $u$, contact 11', conductor $g^x$, 15 mile contact, contacts $t$, $t'$, solenoid 30, and minus of battery.

Path of signal current: Plus of the battery, conductor $u$, contact 11', conductor $g^x$, 15 mile contact, contact $t$, contact 11, yellow light YS, contacts $s^3$ and $s^2$ to minus of battery VB.

Fig. 3A, caution block, moderate speed at or below 15 miles per hour.

Second stage, i. e., following the condition of Fig. 2A: Time relay contacts $t$, $t'$ are open, 15 mile contact is closed, 4 mile contact is open, relays PR, SAR, TL and S are deenergized, solenoid 30 is deenergized.

Main current circuit is broken by opening of contacts $t$ and $t'$ and solenoid deenergized, and brakes applied. Solenoid 30 closes contacts $s^4$ and $s^5$.

Path of signal current: Plus of battery VB, conductor $u$, conductor $s^{11}$, red light RS, contacts $s^5$ and $s^4$ to minus of battery VB.

Fig. 4A, caution block, speed above 15 miles per hour. Immediate brake application.

Time relay contacts $t$, $t'$ are closed, relays PR, SAR, TL and S are deenergized, solenoid 30 is deenergized, 15 mile and 4 mile contacts are open.

Path of main current is broken, as 15 mile contact opens the circuit described in connection with Fig. 3A, solenoid is deenergized as soon as the train reaches caution block at the speed above 15 miles per hour, and the brakes are applied.

Path of signal current the same as in Fig. 3A, through red light RS.

Fig. 5A, caution block, speed below 4 miles per hour.

First stage,—time relay contacts are closed, but are in course of opening, relays PR, SAR, TL and S are deenergized, solenoid 30 is energized.

Path of main current is:—Plus of the battery VB, conductor $u$, contact 11', conductor $g^x$, through 15 mile contact and $t$, $t'$, contacts of TL or through 4 mile contact to solenoid 30 and minus of battery VB.

Path of signal currents: Plus of the battery VB, conductor $u$, contact 11', conductor $g^x$, through 15 mile and $t$, $t'$ contacts, or through 4 mile and $t'$ and $t$ contacts to yellow light YS, contacts $s^3$ and $s^2$ to minus of battery.

Fig. 5B, caution block, speed below 4 miles per hour. Second stage—time relay contacts $t$, $t'$ are open, relays and solenoid conditions are as in Fig. 5A.

Path of main current is the same as in Fig. 5A, except from conductor $g^x$, current is passing only through 4 mile contact to solenoid 30.

Path of signal current is the same as in Fig. 1, except from conductor $g^x$, current is passing only 15 mile contact and $t$, $t'$ contacts to yellow light YS.

I have provided improved means for controlling and operating the trigger valve. The core 30$^x$ of the solenoid has extending from it a rod formed in sections, the outer one 30$^a$ being pivoted to the main part 30$^x$. This pivoted section is pressed down by a spring 30$^b$. It has a hooked end 33 engaging the lever 31. This lever is pivoted at 34 to a suitable bracket and is connected by a link 35 to a lever 32 pivoted at 36. This lever presses on the globular member 37 of the EAV valve which is seated at 38 and is closed in the direction of the air pressure from the equalizing reservoir through pipe 39.

From the casing of the EAV valve a pipe 40 leads to the chamber $a$ of the trigger valve to operate the piston therein to turn the lever 18 of said valve to thus supply air to the air brake apparatus from pipe 13$^x$ and equalizing reservoir.

At 41 there is a plunger operated by air pressure let into the plunger casing through a pipe 42 extending from the chamber a, but the passage of air through this pipe is controlled by the piston b in chamber a. When this has moved far enough to the right to uncover the inlet to pipe 42 the air pressure will pass to the plunger 41, raise it against the pressure of its spring 43 and lift the section 30ª so that its catch 33 will release the lever 31.

It will now be understood that when coil 30 is deenergized, the spring 29 will move the core to the right and operate levers 31, 32 to open the EAV valve. Air will now go through pipe 40 and force piston b to the right to turn valve lever 18 and this action will continue until the lever is held by locking bolt 26. The valve EAV remains open and the air pressure is allowed to act on piston b long enough to insure the engagement of the lever 18 of the trigger valve with the locking bolt 26. This duration of the supply of air is determined and ceases when the left hand edge of the piston b passes the mouth of the pipe 42, whereupon air will go through pipe 42, lift plunger 41 and raise pivoted section 30ª of the solenoid, thus releasing the levers 31, 32 and allowing air pressure in pipe 39 to seat the EAV valve, and cut off the supply of air.

The globe 37 fits loosely on its seat so that when the EAV valve is closed the air in cylinder a, pipe 42 and casing of plunger 41, can leak out through pipe 40 past the globe 37 to atmosphere, so that all parts can be restored to normal position at the proper time and under proper conditions.

I have provided, as shown in Fig. 7, a combined EAV and trigger valve construction in which the core of the solenoid instead of controlling an air supply valve such as 38 above described, controls directly the trigger valve 19 by making the catch 33 engage the trigger valve arm 18ˣ, so that when the solenoid is deenergized the spring 29 will draw the core to the right and cause the catch to turn the trigger arm 18ˣ and open valve to supply air for automatically setting the brakes.

The air let in by trigger valve besides going to the automatic brake applying mechanism will go by branch conduit 42' and lift plunger 41 to release the catch 33 from the trigger arm 18ˣ so that this arm, together with the trigger valve 19, will be free to be restored to closed position, which will happen when pressure builds up in chamber a' and moves piston b' leftward to restore trigger valve to normal closed position when it is released from locking bolt 26 by the built up pressure, as in my application No. 284,731.

The built up pressure to the piston b' is due to the air going through small port 15ª from pipe 15 to chamber 35ˣ and thence by pipe 37ˣ to chamber a'. Referring to Fig. 26, it will be understood that the trigger valve therein shown, while being like that shown in Fig. 6, may be of the modified form, such as is shown in Fig. 7. When the trigger valve opens, equalizing reservoir air pressure passes through this valve to the automatic air release valve A, where, acting on the piston thereof, it pushes this to the right, as a result of which the exhaust port 41' is opened for the escape of air from the train pipe for the automatic application of the brakes. Air also goes through pipe 51 to the engineer's disabling valve, setting the same in closed position to prevent the engineer from recharging the train line by way of the engineer's automatic brake valve H⁶, until after the trigger valve closes and air bleeds off from the valve A through port 22'' and from the engineers disabling valve through port 56, whereupon the engineer, by operating his straight air valve S⁶, can send air pressure through pipe 57 to shift the engineer's disabling valve to open position, whereupon the engineer can recharge the train pipe through valve H⁶ to release the brakes.

It will be understood that electrical potential may be impressed on the rails additional to that which ordinarily exists under clear trackway conditions in the Hall or other signalling system, so as to insure ample potential for holding the relays in such condition as will maintain the automatic train stop apparatus out of action, and this means will be arranged to act automatically in connection with the trackway signalling apparatus.

In Figs. 8 and 9 is shown the specific form of the time limit relay which may be employed. This includes the electro-magnets 44, the armature 45, pivotally mounted at 46, and having an extension or tongue 43 guided in a slot 48 of a bracket 49. This tongue is adapted to engage the contact t' held on the bracket, the said contact being of elongated form, so that the armature will maintain contact therewith for a considerable period of the armature's movement. The armature is engaged by a rod 50 extending from a plunger 51 pressed in a direction to move the armature along the contact t' by a spring 52. The plunger 51 is combined with a piston 53 working in a casing 54 to which air may be admitted through a port 55 controlled by a spring 56 and an adjusting screw 57. This adjusting screw passes through a cap member 58 provided with an air inlet and discharge opening 59. The cylinder 54 is provided with an air port 60. When the electro-magnets 44 are deenergized, the spring 52 will exert its force and move the plunger 51, so that the rod will be operated to move the armature along the contact member t' and beyond the same, so as to break the circuit at this point.

The time which it takes the armature to break this contact by first moving along the member $t'$ and then disengaging therefrom may be varied according to the adjustment of the spring closure 56 of the air port 55. When the magnets are deenergized, the piston 53, together with the plungers 51 and 50, is moved by the spring 52, but the rate of movement will depend upon the amount of air which enters through the port 55. This may be rendered more or less slow, and thus the delay imposed upon the armature 47 may be regulated. When the piston 53, however, opens the port 60 in the cylinder, the piston, together with the plunger and the armature, will be moved quickly so that then the contact will be quickly broken at $t'$, but of course, it will be understood that this action will occur more or less under delay, according to the adjustment at the air port 55.

In Fig. 10 I show an assembly of the cab signals within a suitable casing which is adapted to contain the three signals in the one space to chamber 61. This chamber may also contain the relay or relays and one of these is shown at $S'$. The space 61 is covered with a ground glass, so that the light from any one of the signals will be diffused and will thus be clearly visible to the engineer, and all the signals will appear at the same point and over the same area.

Fig. 11 is a diagram showing two complete blocks of a signal system of known form such as the Hall. I have shown one set of the apparatus, i. e., that belonging to the middle semaphore substantially complete, while the sets at right and left have not been fully represented.

Figure 12:
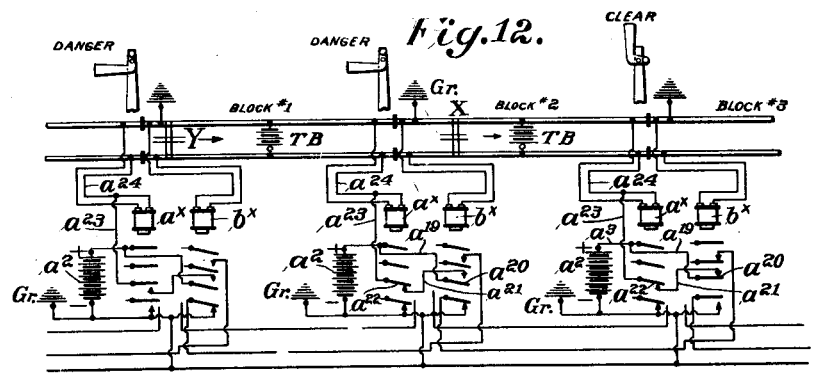

In Fig. 12 I show only those elements of the semaphore operating sets as is necessary to a clear understanding of my invention.

Figure 13:
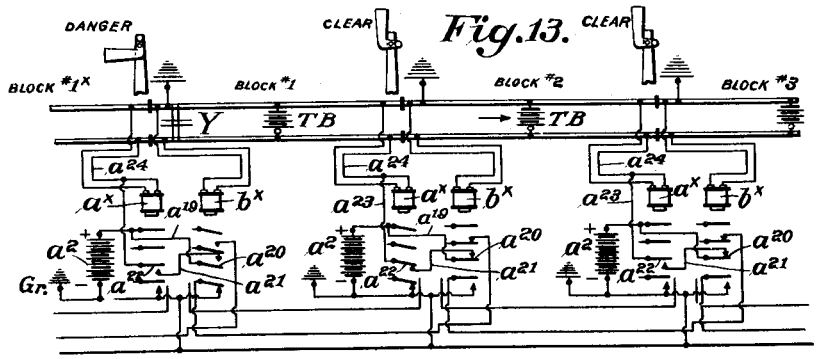

In Fig. 13 is a view similar to Fig. 12, but with the conditions of the system changed because of a different disposition of the trains.

The system disclosed includes, track batteries TB, one in each block, which will be shorted by the presence of the trains in said block, the semaphores, the 16 cell batteries for energizing the motors as $b^{15}$ for operating the semaphores, and 4 ohm relays such as at $a^x$ and $b^x$, contacts controlled thereby and other relays, i. e., the 800–100 and the 50 ohm relays, all of which belong in the ordinary system. When a block is occupied by a train, or is otherwise in a dangerous condition in respect to an oncoming vehicle, the TB is shorted and the 4 ohm relays of this block release their armatures which will result in setting the semaphore at the entrance to this block to danger, and the semaphore at the entrance to the preceding block to caution, and furthermore electric potential will be removed from that block which lies between these caution and danger signals, so that, the automatic brake applying mechanism will operate or not according to the speed of the train and the distance the train goes into the block. These effects are initiated by the primary relay PR, on the vehicle which as above stated, so long as current potential exists in the rails, will maintain the automatic brake apparatus off, but when this electric potential is absent, then under certain conditions prescribed above, the automatic brake apparatus will operate to apply the brakes.

Referring to Fig. 11, this shows the conditions with all the blocks clear, in which event there would be no potential from any of the 16 cell batteries impressed on the rails, but only from the track batteries.

Fig. 12 shows the conditions with a train or vehicle in block #1, and that danger conditions exist in block #2, i. e., by a train X occupying said block, and with the blocks ahead of the occupied blocks clear.

Fig. 13 shows the conditions with block #2 clear and block #1 occupied.

Referring to Fig. 12, the presence of a train in block #2 will short the track battery TB of that block and the armatures of the two 4 ohm signal relays $a^x$ and $b^x$ will drop but the 4 ohm relay $b^x$ of the clear block #3 will remain energized, there being no shorting of its track battery and consequently the armature of this relay will be held up.

A circuit will now be established from plus side of 16 cell battery $a^2$, wire $a^3$, wire $a^{19}$, armature and contact $a^{20}$ which remain closed because 4 ohm relay $b^x$ on block #3 remains energized. From contact $a^{20}$ the current goes through wire $a^{21}$, to contact and armature $a^{22}$ of the 4 ohm relay $a^x$ of block #2, and thence by wire $a^{23}$, to bite into the wire $a^{24}$, between the 4 ohm relay $a^x$ of block #2 and one of the rails.

From this rail the current would pass through the relay on the vehicle and thence to ground $Gr$ and thence back through ground to the negative side of the 16 cell battery $a^2$.

This current will therefore be impressed on the rails of this block and the primary relay on the vehicle, in addition to the current derived from the battery TB.

From the above it will be understood that the primary relay on the vehicle will be wound to have a certain dropping offpoint, and this will be determined in relation to the potential available when the current from the 16 cell battery is impressed on the rails. That is to say, when the current from the 16 cell battery is on the rails the relay PR will be held closed, and the potential then existing may be considerably above that which is necessary to hold the relay closed, thus giving ample margin for leakage. When the potential from the 16 cell battery is not impressed on the rails then the armature of the primary relay will be released and assume neutral position because the current potential will be below the dropping offpoint, and the brakes will be applied or not according to the speed as hereinbefore set forth.

Now as to block #1 under the conditions illustrated in Fig. 12, there will be no current impressed on the rails, or the primary relay of the vehicle, when the block ahead, i. e., #2, is occupied by a train or is under danger conditions of any kind. The dropping of the armature $a^{20}$ belonging to the 4 ohm relay $b^x$ of block #2 will open the circuit $a^{19}$, $a^{21}$, $a^{22}$, $a^{23}$, $a^{24}$ of block #1 leading from the plus side of the 16 cell battery $a^2$ of this block #1 to the rails, and hence no current will pass to the rail to augment the potential of the track battery of this block #1, and the vehicle's relay PR will no longer be held in normal position and the vehicle will be subject to automatic control according to speed.

Under the conditions shown in Fig. 13 which shows a train on block #1, but blocks #2 and #3 clear, we will get no impression of potential from the 16 cell batteries in either of the blocks #2 and #3. All the armatures will be held up by the 4 ohm relays of blocks #2 and #3 and the circuit from the 16 cell battery $a^2$ of block #2 to the rail will be broken at $a^{22}$ of this block. In the occupied block #1 the circuit from the 16 cell battery $a^2$ will be completed through the holding up of armature $a^{20}$ of block #2 and the dropping of the armature $a^{22}$ of block #1, these actions being due respectively to the fact that the 4 ohm relay $b^x$ of block #2 procures current from the track battery of that block, and to the fact that the train shorts the track battery of block #1 and causes the 4 ohm relay $a^x$ of block #1 to be deenergized. So far as the block #1$^x$ at the left of block #1 is concerned the circuit from the 16 cell battery $a^2$ will be broken at $a^{20}$ of block #1 by the fall of the armature due to deenergized 4 ohm relay $b^x$ of block #1 and by the lifting of armature $a^{22}$ of the energized 4 ohm relay $a^x$ of said left hand block #1$^x$. It will thus be seen that the electric potential derived from the 16 cell batteries ordinarily employed to operate the motors of the semaphores, is brought into use as is needed, being controlled by the presence or absence of a train in the block.

Diagram 11 illustrates "sneak" currents by the wavy areas extending between the rails.

This leakage is apt to occur with certain kinds of road ballast particularly in wet weather, and my object of the invention is to impress the potential from the 16 cell battery on the rails only when needed in the particular block being traversed. At all other times no current will pass from the 16 cell battery to the rails.

I may install along the trackway a system of batteries, relays and wiring to be used either with or without a trackway signalling system, for obtaining the conditions in the rails necessary for maintaining the automatic train stop mechanism in normal inoperative condition, or causing it to operate to set the brakes.

In installing this system, which will perform its function without interference with the ordinary trackway signal system, I arrange the battery leads to connect with one rail near one end of the block and with the other rail near the other end of the block, so that the primary relay located on the vehicle will not be subject to fluctuation due to varying resistance, which, if the leads for instance, were connected with both rails at points adjacent each other, would result from the constantly changing track length between the vehicle and said leads, as the vehicle approached or receded therefrom. This is illustrated diagrammatically in Fig. 14, showing that the path of current will have always the same length, i. e., from, say, plus of battery $f$ through conductor $f$, $f'$, part of rail length $f^2$, train axles in multiple $f^2$ $f^3$, another part of rail length $f^3$ $f^4$, conductor $f^4$ $f^5$, and minus of battery. It is understood, however, that athough the polarity indicates direct current arrangement, the above diagram will be equally applied to the alternating current. It must be also noted that the location of battery would not affect the resistance of circuit, i. e., battery could be located any place between $f^4$ and $f'$. The train and relay PR are here shown in a conventional way.

Figure 15:
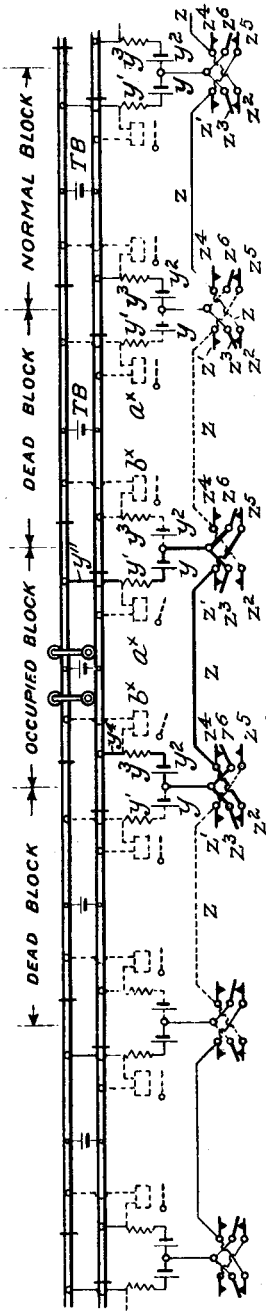
Fig. 15 is a diagram of trackway controlling system to be used with or without the signalling system.

In carrying out this part of the invention I use, as shown in Fig. 15, a split battery, one section $y$ of which is connected to a relay $y'$ and thence by wire $y''$ to one rail at or near one end of the block, and the other section $y^2$ of this battery is connected through relay $y^3$ and wire $y^4$ with the other rail at or near the opposite end of the block. From this arrangement it will be observed that the length of the circuit including the front and rear axle of the vehicle and the electric connection between these axles, in which the primary relay is set, the rails and the relay coils and battery sections, will remain of the same length while the vehicle is traversing this part of the track, and hence there will be no undue variation in potential of the current passing through the primary relay on the vehicle and the armature of this relay will not fluctuate but will remain in the prescribed position to hold the automatic brake controlling mechanism in normal position.

Extending alongside the track there is a wire $z$ in sections, with contacts $z'$, $z^2$ controlled by the armature $z^3$ of relays $y'$ and with contacts $z^4$, $z^5$ controlled by armature $z^6$ of relay $y^3$. It must be noted that when relays $y'$, $y^3$ are deenergized their armatures are in contact with $z^2$ and $z^5$ respectively. The armatures $z^3$ and $z^6$ are connected electrically with points midway between the battery sections $y$ and $y^2$ of adjacent blocks, which in Fig. 15, for convenience are marked "Dead block", "Occupied block", and "Normal block." There is one section of the wire $z$ and one set of the devices, contacts, split batteries, etc., for each block.

One object of the present system is to render the blocks in advance and in rear of an occupied block electrically dead, so that if a train approaches the train on the occupied block from either direction it will enter the dead block and will be subject to automatic braking to secure, if used with the particular vehicle apparatus described, a stop immediately, if running at a speed, say above 15 miles an hour, or if below that speed it will be allowed to proceed a prescribed distance, say ⅞ of the block before being stopped, or if running at a safe low speed it can proceed. The primary relay of the vehicle on the "Occupied" block will receive current of substantially constant potential.

The block designated as "Normal" is one not occupied by a vehicle and is not adjacent an occupied block.

This may be regarded as the normal condition of the blocks and in such blocks the armatures $z^3$, $z^6$ of the relays are down on their lower contacts $z^2$, $z^5$ and this is true also of the adjacent armatures $z^3$ and $z^6$ of the adjoining blocks, so that what may be termed a "preparatory" circuit is established in this "Normal" block, needing only the presence of a vehicle in said block to complete this circuit. Such a condition is shown at the right of the figure marked "Normal block". This "preparatory" circuit is established from one rail through relay $y^3$, battery section $y^2$ of this "Normal" block, armature $z^3$ of the adjacent "Dead" block, (at the left), contact $z^2$, wire $z$, contact $z^5$ of the adjacent block (at the right), its armature $z^6$, battery section $y$, relay $y'$, to the other rail. The dropped position of all the armatures mentioned is due to the fact that their relays are not energized normally but the circuit is prepared for completion by the entrance of a vehicle into this "Normal" or live block which closes the gap existing from rail to rail, and thereupon will induce the condition illustrated in the "Occupied block" of said Fig. 15.

The closing of the preparatory circuit across from rail to rail through the primary relay on the vehicle will result in holding the automatic brake applying means out of service, and the effect of this will be to energize the relays $y'$, $y^3$ of this occupied block, lifting the armatures $z^3$, $z^6$ from the lower to the upper contacts $z'$, $z^4$. The armature $z^3$ of the block to the left and the armature $z^6$ of the block to the right of the "Occupied" block will remain down, and we will then have a completed circuit from one rail through relay $y^3$ of this block, its battery section $y^2$, thence through dropped armature $z^3$ and contact $z^2$ of the adjacent block (at the left) or alternatively and simultaneously through raised armature $z^6$ and contact $z^4$ of this block wire $z$, then through contact $z^5$ and armature $z^6$ of the adjacent block (at the right) or alternatively through contact $z'$ and raised armature $z^3$ of this "Occupied" block, through battery section $y$ and relay $y'$ and wire $y''$ to the other rail, thence through the vehicle and the primary relay thereon to the rail first mentioned.

Now the condition just described as established in the occupied block not only maintains the primary relay of the vehicle in that block energized, but it makes the adjacent blocks in advance and in rear thereof electrically dead so far as the automatic train stop system and associated devices are concerned, because of the lifting of the armatures $z^3$ and $z^6$ of this occupied block.

Under these conditions there will be no "preparatory" circuit established in these "Dead" blocks, but said circuits will be open at the contacts $z^2$ and $z^5$ of this occupied block and if a vehicle enters either one of these 'Dead" blocks it will not complete a circuit, and hence its primary relay will not be energized and it will be subject to an immediate or deferred brake application, according to its speed or to continued progression if its speed is down to the prescribed slow safety rate.

The above system can be installed without interference with the ordinary trackway signalling system, and I have shown at TB the ordinary track batteries of such systems and the ordinary 4 ohm relays $a^x$, $b^x$ with their armatures. The vehicle will short circuit these relays as in ordinary practice. In case of a "Normal" block, ordinary 4 ohm relay would be energized from the battery TB and from batteries $y'$, $y^3$, which in this case will work in parallel. In case of a "Dead" block, the battery TB only will hold 4 ohm relays, as the circuit of batteries $y'$, $y^3$ is open. If batteries TB were omitted at "Dead" block, 4 ohm relays would be deenergized, which would be contrary to present side track signal practice.

It must be noted also that the voltage of batteries TB is not sufficient to hold the primary relay of a locomotive for two reasons. First, it is small, second, it is not applied to the opposite ends of the rails, which method gives largest current through the relay.

The above is explained in order to give a clear idea that batteries $y$, $y^2$ will not affect side track signalling, and that track signal batteries TB will not affect the action of the automatic train stop device.

I have not shown the signalling system in full detail as I consider the showing of the elements mentioned sufficient to make clear that the ordinary signalling system can be used without being disturbed by my installation described.

Figure 16:
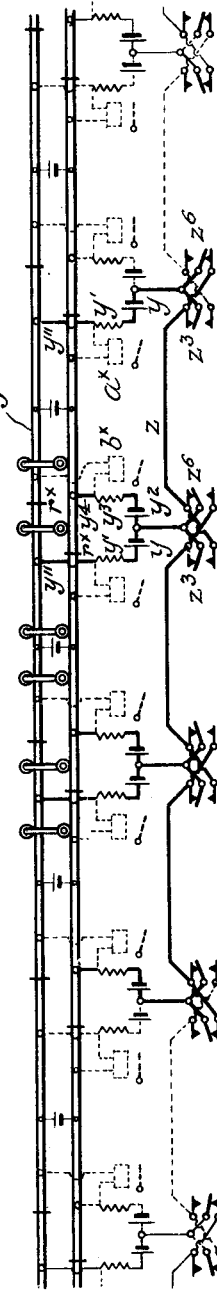
Figs. 16 and 17 are views of the system of Fig. 15 under different conditions.

In Fig. 16 is shown how the circuit is maintained through the primary relay of the vehicle when the vehicle is passing from one block to another. It will be seen that the joints of the rails at the ends of the block are staggered more or less in relation to each other, the wire $y''$ from relay $y'$ being connected to one rail say on the left hand side of the joint between the block while the wire $y^4$ is connected with the other rail on the right hand side of the joint between the blocks. Now supposing that the pony truck of the vehicle enters upon the overlapped portions of the rails as indicated in Fig. 16 between the joints $r^x$ while the rear wheels of the vehicle or tender occupy the rail sections of the block to the right of the joints mentioned. A local circuit will be established through the battery sections $y$, $y^2$, relays $y'$, $y^3$, wire $y^4$ through one portion of the rail, the truck axle and the other rail section and $y''$. As a result of this the armature $z^6$ of the block to the right of the insulated joints $r^x$ will be held up and as the armature $z^3$ at the right of this block is already up, the circuit through the primary relay of this vehicle will be maintained and may be traced as follows:

From battery section $y^2$, relay $y^3$, wire $y^4$, pony truck axle, through the rail $y^5$, thence through wire $y''$ at the right of this block, relay $y'$, battery section $y$, raised armature $z^3$, wire $z$, raised armature $z^6$ to battery $y^2$. With a long train the circuit through the primary relay will be maintained despite the fact that the train may reach over an entire block and part way into the adjoining blocks.

Figure 17:
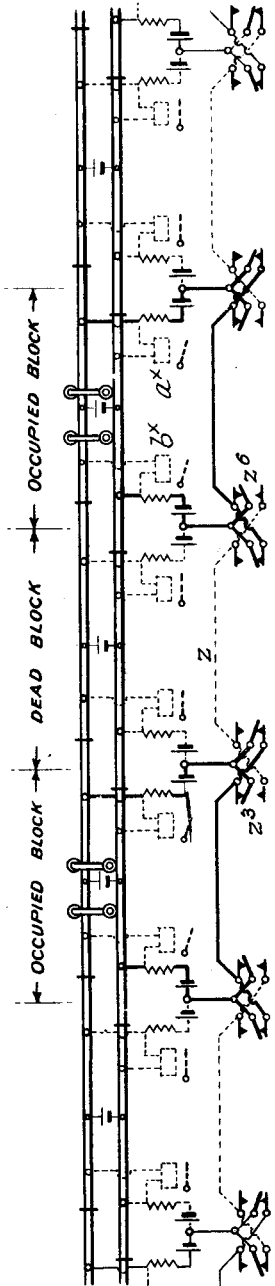

In Fig. 17 is shown a diagram with two occupied blocks and a dead block in between. The vehicles may be considered to be running either in the same direction, or in opposite directions, or one at rest and the other running into the dead block. In either case the train entering the dead block will be subject to an automatic stop as it will find there no circuit prepared to be completed by its presence in this block, said circuit being broken at the armatures $z^3$ and $z^6$, the section of the wire $z$ belonging to this block being cut out at both ends thereof.

*Fouling points and switch tracks.*

My system includes means for preventing automatic braking when passing from the main line equipped with the trackway devices for controlling automatic braking, onto a switch track which is not provided with my trackway appliances, and my object here is to provide means whereby the automatic braking mechanism may be eliminated on entering the switch and automatically restored to service when coming out from the switch line onto the main line again, so that the train can pass over non-equipped portions of the trackage without having the brakes set.

I provide means whereby the engineer can manually prevent braking when passing into and over a non-equipped switch track, and whereby the braking apparatus will be automatically restored for automatic use when passing back onto the main line again.

Another form of this apparatus entirely automatic both on entering the switch track and on leaving this track to resume travel over the main line.

In Fig. 18 I show the contacts $p$, $p'$, and the armature P of the primary relay PR connected up to the battery VB, and the relay SAR as described above. A branch circuit from the armature P and contact $p'$ or $p$, (these being connected electrically as before) includes a circuit closer $p^4$ which when pushed by the finger of the engineer upon the push button $p^5$ closes the circuit at the contact $p^6$, through the electro-magnet $p^7$, so that the engineer upon entering the switch closes this branch circuit which thus keeps the relay SAR energized from battery VB despite the fact that the armature P of relay PR has assumed neutral position owing to the absence of current in the rails of the switch track. The electro-magnet having been energized by the closing of the branch circuit at $p^6$ will retain the armature $p^4$ closed upon contact $p^6$ as long as the train remains on the switch track. As soon, however, as vehicle leaves the switch track and enters the main line block, the rails of which are energized, the relay armature will close upon contact $p$ or $p'$ and the main circuit will be re-established through SAR from battery VB through wire $u$, primary relay, relay SAR and wire $p^3$ back to the battery, and electro-magnet $p^7$ thereby being shunted the circuit closer $p^4$ will be released and a spring $p^8$ will restore it to normal position. This circuit closer with its push button is enclosed in a casing having an aperture in which the engineer inserts his finger and any suitable means may be provided such as a diaphragm over the push button which will allow the engineer to push the button and will prevent him from pulling the button outwardly, so that the parts will remain in position with the branch circuit closed until they are restored automatically as above described upon leaving the non-equipped portion of the track such as a switch or the like. The closing of the armature of the relay PR upon its contact $p$ or $p'$ on coming out from the switch onto equipped territory and the shunting of the electro-magnet $p^7$ and consequent release of circuit closer $p^4$ will be due to the higher resistance of the branch circuit, which includes the electro-magnet, in respect to circuit through $n$, and SAR. The branch circuit may include a signal light W as shown, so that the engineer may see when he is remaining on, or when he is off the switch track. The push button if exposed may be so arranged that it will be more or less inconvenient for the engineer to maintain the pressure thereon and he will thus be deterred from eliminating the automatic train stop apparatus on the vehicle.

Instead of operating the push button manually, its control may be entirely automatic both on entering and leaving the switch track thus removing the "permissive" feature of this part of the apparatus.

For this purpose as shown in Fig. 19 I may employ as one example, a ramp at the entrance to the switch track as shown at $p^9$, which operates a lever $p^{10}$ on the vehicle to operate the push button by a rod $p^{11}$. The parts will stay in their operated position as long as the vehicle is on the dead switch track, but as soon as it comes out onto the live block, the parts will be released and will assume their inoperative position.

Instead of a mechanical automatic controlling device such as a ramp, I may control the branch circuit closer $p^4$ from a special track-way battery $p^{12}$, Fig. 20. The vehicle would be equipped with a special brush $p^{13}$ in circuit with a contact rail or strip $p^{14}$, battery $p^{12}$, the rail, car wheel and axle, and wire $p^{15}$ to solenoid $p^{16}$, the core of which is connected with the circuit closer $p^4$, so that when the solenoid is energized the branch circuit will be closed and will remain closed because of energizing electromagnet $p^7$, as long as the branch circuit including parts of relay PR is maintained, this of course, being as long as the vehicle remains on the dead switch. On coming out upon the live block, however, the operation of the relay PR will deenergize the electromagnet $p^7$ and the circuit closer will open, the core of the solenoid then resuming its normal position. The solenoid, of course, will have been already deenergized as soon as the brush $p^{13}$ leaves the short contact strip $p^{14}$.

Instead of the above I may use an induction device at the entrance to the dead or branch switch to secure the automatic operation.

Relay PR.

This relay may be of the form shown in Fig. 21, in which there are two armatures $p^x$ each controlled by its own coil. One of these coils is in a conductor on the locomotive extending diagonally from the right hand side of one axle to the left hand side of the other axle, and the other coil is in a conductor similarly disposed on the tender.

The purpose of this form of relay is to prevent interruption of the holding current while the train is passing over the joints in the rails between blocks.

The figure shows that, for instance, the locomotive fore and aft axles are on opposite sides of the insulated joints and no current is passing through these axles and the coil connected therewith, but that the axles of the tender are in circuit with the rails and the other coil of this relay PR.

Fig. 22 is a modification of this primary relay on the train, showing that alternate axles are connected in multiple with the relay having only one coil. I do not limit myself to this means of preventing current interruption, as other means may be employed within the skill of the engineer versed in this art. For instance, relay SAR may be a slow acting relay.

The trackway system not only may be used with or without a trackway signalling system, as stated above, but I do not limit myself to the use with said trackway system of the particular controlling means shown on the vehicle.

I have provided means whereby the speed of the train may be prevented from exceeding that predetermined upon.

This consists of a valve $76^x$ closing a port $77^x$ leading to atmosphere from a pipe $52^e$ leading from equalizing piston chamber D of the engineer's valve $H^6$, (Westinghouse engineer's automatic brake valve). The valve $76^x$ is controlled by the governor G, Figs. 1, 23 and 26 through a lost motion connection at $78^x$—$79^x$. As the stem of the governor runs down upon increase of the speed of the train, the valve will open and allow air to escape from the equalizing piston chamber D of the engineer's valve ($H^6$ Westinghouse), allowing the ordinary valve therein to open the B P Ex port and thus apply the brakes. When the speed is lowered the valve closes allowing pressure to build up in chamber D, closing B P Ex port and causing the brakes to be taken off, and allowing the train to proceed at this reduced speed. This valve mechanism is adjustable so that it may be set to control the speed at any desired rate. For this purpose access may be had to the screw $80^x$ by removing a part of the casing, and thus the stem and head $78^x$ may be adjusted in relation to the valve $76^x$ and the head of cylinder $79^x$. A spring $81^x$ presses the valve up against its seat.

It will be understood that the drawings and description forming a part of this application, are illustrative and are not intended to be restrictive upon the scope of my invention and various changes may be made therein, and in the elements employed, within the skill of the electrical or air brake engineer, without departing from the principles herein set forth.

The speeds of the train herein mentioned are merely illustrative.

My apparatus is distinguished from any other device using roadside contact means or track induction or wireless methods, inasmuch as I employ nothing suspended down or extending outward from the vehicle or train to provide means to actuate the automatic apparatus on the engine or train. In this connection I would point out that while I show depending means in connection with my fouling point system, the use of these is optional and may be supplanted by other means, and these depending means do not pertain to the main electrically equipped line.

My system is one of continuous control to meet all conditions which may arise due to presence or absence of trains in the blocks ahead or in rear, or to breaking of a rail, bridge or other failure of a part of the system, and this continuous control is exerted whether the conditions exist prior to the entry of a train into a block, or after the train begins to traverse the said block.

My signalling system not only differs from common practice in that the signals are located on the vehicle in view of the engineer instead of alongside of the trackway, but it will be noticed that my indications are continuous and are not temporary or intermittent. Thus each signal is maintained until it is changed to another signal and this new signal persists until the next change takes place and so on, the engineman having before him at all times some one of the signals indicating the condition ahead or in rear.

Furthermore, where roadside signals are used together with my signals in the cab, the latter will synchronize with the changes in the roadside signals, and when roadside signals are not used, my signals will synchronize with the changes in the conditions of the trackway.

It will be understood that if the governor operating connection fails, or the governor itself fails, the governor contact will assume a position where it does not engage with the companion contacts and under these conditions, if the trackway is under danger or caution conditions, the train will receive a brake application automatically, whatever the speed of the train may be.

Certain features disclosed herein are embodied in or related to subject matter of an application filed by me March 24th, 1919 Serial Number 248,731, in interference and of applications Serial No. 620,286 filed Feb. 20, 1923, Serial No. 4,484 filed Jan. 24, 1925, and Serial Nos. 610,879 and 610,880 filed Jan. 5, 1923.

Certain features disclosed herein are embodied in my application filed Jan. 5, 1923, Serial No. 610,880.

I claim:

1. In train control apparatus the combination of means for imposing direct electric current upon or absenting it from the traffic rail system of a block according to traffic conditions, air brake controlling apparatus on the vehicle including a primary relay in an electric conductor in continuous contact with the rail system to receive direct current therefrom, due to the potential drop between the points of contact of said conductor therewith, said primary relay holding the brakes off when the prescribed imposed current is present in the rail system of the block occupied by the vehicle, and causing the brakes to be applied when said prescribed current is absent from said rail system, said apparatus on the vehicle also including means governed by the speed of the vehicle and operating to hold the brakes off at a certain speed or speeds and to permit the application of the brakes at a certain other speed or speeds, substantially as described.

2. In train control apparatus, the combination of means for imposing direct electric current upon or absenting it from the traffic rail system of a block according to traffic conditions, air brake controlling apparatus on the vehicle including a primary relay in an electric conductor in continuous contact with the rail system to receive direct current therefrom, due to the potential drop between the points of contact of said conductor therewith, said primary relay holding the brakes off when the prescribed imposed current is present in the rail system of the block occupied by the vehicle, and causing the brakes to be applied when said prescribed current is absent from said rail system, said apparatus on the vehicle also including speed controlled means and a timing element to defer the application of the brakes in a caution block, from which the prescribed direct current is absent, until after the prescribed time controlled by said timing element, has elapsed, substantially as described.

3. In train control apparatus the combination of means for imposing direct electric current upon or absenting it from the traffic rail system of a block according to traffic conditions, air brake controlling apparatus on the vehicle including a primary relay in an electric conductor in continuous contact with the rail system to receive direct current therefrom, due to the potential drop between the points of contact of said conductor therewith, said primary relay holding the brakes off when the prescribed imposed current is present in the rail system of the block occupied by the vehicle, and causing the brakes to be applied when said prescribed current is absent from said rail system, said means on the vehicle also including speed controlled means and a timing element controlled thereby, the speed controlled means permitting the application of the brakes at high speed and preventing application at low speed and the timing means deferring brake application at an intermediate speed until a prescribed interval of time has elapsed during which the vehicle will have proceeded part way through the caution block.

4. In combination, a trackway block system, and an electrically operated train stop apparatus on the vehicle including a relay, controlled by the presence or absence of prescribed direct electric current in the rail system of the block being traversed, and governor means on the vehicle operated to accord with the speed of the train and determining whether or not the said control will be exerted when said direct current is absent from said rail system, said relay being in an electric conductor having its terminals continuously in travelling contact with the rail system and receiving direct current due to potential drop between the contacting points of said terminals with the rail system, substantially as described.

5. Automatic train control apparatus comprising automatic brake applying means on the vehicle, and controlling means therefor comprising in part, electrical means controlled by the electrical conditions in the trackway rails and in part by the speed of the train, said controlling means acting to set the brakes after a prescribed time interval has elapsed at moderate speed of the train, when the prescribed direct electric potential is absent from the rail system of said block, and means for removing said direct electric potential when a block ahead is occupied or is under danger conditions, said electrical means including a primary relay in a conductor receiving direct current from the rail system due to the drop in potential between the points of contact of said conductor with said rail system.

6. Automatic train control apparatus comprising brake applying means on the vehicle and controlling means, comprising in part electrical devices on the vehicle and in part means on the vehicle for deferring automatic brake application at a certain speed, said controlling means being in continuous electric connection with the rail system and rendered effective in applying the brakes by absence of a prescribed direct electric potential in the rail system, and means for removing said electric potential as a result of occupancy by a vehicle of an adjacent block or blocks.

7. In combination, in automatic train control apparatus, means for imposing direct electric current upon the traffic carrying rail system of a block, automatic brake applying means on the vehicle, and means for automatically controlling the same to apply the brakes upon entering a caution block at high speed or after proceeding for a prescribed time into said block at a moderate or control speed and permitting said vehicle to continue over said caution block when running at a safe low bumping speed, said means including a primary relay on the vehicle in a conductor receiving direct current due to the potential drop between its spaced apart points of contact with the rail system substantially as described.

8. In combination, means for imposing direct electric current upon the traffic carrying rail system of a block, and an electrically operated train stop apparatus on the vehicle, controlled to set the brakes by the absence of prescribed direct electric current in the rail system of the block being traversed, governor means on the vehicle operated to accord with the speed of the train and determining whether or not the said control will be exerted or not, timing means also on the vehicle for delaying the stopping of the vehicle when running at certain speeds and a primary relay on the vehicle in a conductor receiving direct current due to the potential drop between its points of contact with the rail system, said relay controlling the said train stop apparatus.

9. An automatic train stop apparatus comprising means for imposing direct electric current on the trackway rails of a block means for applying the brakes, a closed electric circuit with means for energizing the same to hold the said brake applying means inactive, and means on the vehicle normally energized from the rail system for maintaining said circuit closed, the last mentioned means acting when deenergized by absence of prescribed current in the rail system to open the said circuit and cause the brakes to be applied, and means for removing the prescribed current from the rails when the block ahead is occupied.

10. In combination with a trackway system including means for supplying direct electric current to the traffic carrying rails of the block under clear conditions and for deenergizing the rails of said block under caution or danger conditions, brake applying apparatus on the vehicle, primary relay means on the vehicle, deriving direct current from the rail system when the block is clear and deenergized by the absence of prescribed current in the block when the condition of the block is at danger or caution, said brake applying apparatus being controlled by the said primary relay means, and means for deenergizing the rails of the caution block by the presence of a vehicle in the block ahead, said primary relay means being in a conductor in continuous contact with the rail system substantially as described.

11. In combination, means for imposing direct current upon the rail system of a block automatic brake applying apparatus on the train including a primary relay in a conductor in continuous electric contact with the rail system electro-magnetic means energized under clear conditions but deenergized by the absence of current in the trackway rails, under danger or caution conditions for applying the brakes, said apparatus also including a governor adjusted by the speed of the vehicle and exerting control of the circuit to said electro-magnetic means, and a timing device controlled from the primary relay and also exerting control of said circuit, said timing device delaying the automatic application of the brakes until a prescribed time interval has elapsed, and means for deenergizing the rails of the caution block by the presence of a vehicle in the block ahead, substantially as described.

12. In automatic train stop apparatus, means for imposing direct electric current upon the traffic carrying rail system brake applying apparatus on the vehicle, operating to set the brakes as a consequence of absence of the prescribed direct electric current while traversing a block, and to maintain the brakes off when the prescribed current exists in the block, said apparatus including a primary relay in a conductor in continuous contact with the rail system governor means variably driven, according to the speed of the train and exerting control of a circuit to said brake applying apparatus and timing means to delay the automatic application of the brakes until a prescribed time interval has elapsed, at a prescribed moderate speed, and means for deenergizing the rails of the caution block by the presence of a vehicle in the block ahead, substantially as described.

13. Automatic brake applying apparatus comprising electro-magnetic means on the train for causing the application of the brakes, when prescribed direct current is absent in the block, and for causing the brakes to be held off when prescribed direct current is present in said block, said apparatus also including timing means for delaying the application of the brakes, and governor means adjusted automatically and in accordance with the speed of the train for effecting the immediate application of the brakes on entering a so-called dead block at high speed, delaying the application of the brakes until after a predescribed time interval has elapsed at a moderate speed and for maintaining the brakes off while approaching or passing the danger point at a prescribed low speed and a primary relay on the vehicle in a conductor receiving direct current due to the potential drop between its points of contact with the rail system and forming a part of the brake applying apparatus, substantially as described.

14. Automatic train stop apparatus mounted on the train and including electro-magnetic devices operating to hold the brakes off while the train is traversing electrically energized trackway rails of a block, and to be deenergized when the train is traversing rails from which the prescribed current is absent, means set by the speed of the train, said means determining when the brakes shall be applied during the time the train is passing over said dead rails, and a primary relay on the vehicle in a conductor receiving direct current due to the potential drop between the points where its ends are in connection with the rail system and forming a part of said train stop apparatus.

15. Automatic train stop apparatus, comprising electro-magnetic means on the train controlled by the absence of prescribed direct current in the rails, for applying the brakes, and governor means on the train set by the speed thereof for determining whether or not the brakes shall be applied, substantially as described and a primary relay on the vehicle in a conductor receiving direct current due to the potential drop between the points where its ends are in connection with the rail system and forming a part of said train stop apparatus.

16. In combination, a traffic carrying rail system, an air valve mounted on the vehicle controlling the application of the brakes, a relay on the vehicle opened by the absence of electrical potential in the block being traversed, a local battery on the vehicle, a second relay in circuit with said first relay and battery and with said air valve, electrically controlled timing means also in said circuit to determine when the brakes will be applied at certain speeds, and governor means for controlling the same circuit which is controlled by the timing device, said first mentioned relay being in a conductor receiving direct current due to the potential drop between the points of contact of said conductor with the rail system substantially as described.

17. In combination in a train stop apparatus, means for imposing current upon the traffic rail system electro-magnetic means for controlling the brake applying means, contacts controlling the circuit to said electro-magnetic means, an electro-magnetic timing device for controlling said contacts, relay controlled circuit connections leading respectively to said contacts and to the coil of said electro-magnetic timing device, said relay being adapted to make and break said electrical connections, governor means operated according to the speed of the train and controlling electrical connections to said contacts, whereby the circuit of the said electro-magnetic controlling means of the brake applying means may be maintained after said relay breaks the circuit connections controlled by it, and a controlling primary relay in a conductor receiving electric current from the rails due to the potential drop between the points of contact of said conductor with the rail system and controlling the other relay, substantially as described.

18. In combination in a train stop apparatus, means for imposing electric current upon the rails electro-magnetic means for controlling the brake applying means, contacts controlling the circuit to said electro-magnetic means, an electro-magnetic timing device for controlling said contacts, relay controlled circuit connections leading respectively to said contacts and to the coil of said electro-magnetic timing device, said relay being adapted to make and break said electrical connections, governor means operating according to the speed of the train and controlling electrical connections to said contacts, whereby the circuit of the said electro-magnetic controlling means of the brake applying means may be maintained after said relay breaks the circuit connections controlled by it, said governor means controlling also circuit connections at low speed which will maintain the circuit to said electro-magnetic means first mentioned independent of the said relay and timing means, and a controlling primary relay in a conductor receiving electric current from the rails due to the potential drop between the points of contact of said conductor with the rail system and controlling the other relay, substantially as described.

19. In combination in train stop apparatus, means for imposing current upon the traffic rail system, an air valve, electro-magnetic means controlling the same, a battery in circuit with said means, a timing device including a coil, a movable core, a contact carried by the movable core, and a fixed contact, said contacts being in the circuit of the electro-magnetic means first mentioned, a relay contact also in said circuit and controlling current to the timing contacts, a relay contact controlling current to the coil of the timing device, relay means controlling said relay contact, means controlling said relay means according to the condition of the block being traversed as to clear, caution or danger, a governor on and driven from the moving vehicle, said governor having electrical contacts controlling current to the timing contacts independent of the relay contacts, and a controlling primary relay in a conductor receiving electric current from the rails due to the potential drop between the points of contact of said conductor with the rail system and controlling the other relay, substantially as described.

20. In combination in train stop apparatus, means for imposing current upon the traffic rail system, an air valve, electro-magnetic means controlling the same, a battery in circuit with said means, a timing device including a coil, a movable core, a contact carried by the movable core, and a fixed contact, said contacts being in the circuit of the electro-magnetic means first mentioned, a relay contact also in said circuit and controlling current to the timing contacts, a relay contact controlling current to the coil of the timing device, relay means controlling said relay contacts, means controlling said relay means according to the condition of the block being traversed as to clear, caution or danger, a governor on and driven from the moving vehicle, said governor having electrical contacts controlling current to the timing contacts independent of the relay contacts, said governor contacts including one for controlling current to the timing contacts at a moderate speed of the train, and another for controlling current to the air valve electro-magnetic controlling means while shunting the timing device and a controlling primary relay in a conductor receiving electric current from the rails due to the potential drop between the points of contact of said conductor with the rail system and controlling the other relay, substantially as described.

21. In combination in train stop apparatus, a trackway block system, apparatus on the vehicle for applying the brakes, signal means on the vehicle, said brake applying apparatus and signal means being controlled by the electrical conditions in the block system and by the speed of the train, substantially as described.

22. In combination in train stop apparatus, a trackway block system, apparatus on the vehicle for applying the brakes, signal means on the vehicle, said brake applying apparatus and signal means being controlled by the electrical conditions in the block system and by the speed of the train, and timing means controlled by the conditions in the block system and also exerting control of the signal means, substantially as described.

23. In combination in train stop apparatus, a trackway block system, brake applying apparatus on the vehicle, signals on the vehicle, automatic means for applying the brakes and displaying the danger signal when danger conditions exist, with the vehicle running at high speed, automatic means for delaying the application of the brakes and for displaying the caution signal while the train is running at moderate speed for a prescribed time interval in the danger zone, and for displaying a danger signal and for applying the brakes if the train progresses beyond said prescribed time interval.

24. In combination in train stop apparatus, a trackway block system, brake applying apparatus on the vehicle, signals on the vehicle, automatic means for applying the brakes and displaying the danger signal when danger conditions exist, with the vehicle running at high speed, automatic means for delaying the application of the brakes and for displaying the caution signal while the train is running at moderate speed for a prescribed time interval in a danger zone, and for displaying a danger signal and applying the brakes if the train progresses beyond said prescribed time interval, and for holding the brakes off and displaying a caution signal if the train is traversing the danger zone at a prescribed low speed.

25. In combination in train stop apparatus, a trackway block system, brake applying apparatus on the vehicle, a clear, caution and danger signal on the vehicle, a governor operated according to the speed of the train and controlling said caution and danger signals, and means controlled by the presence or absence of prescribed current in the block being traversed by the train for exerting control of the said signals, substantially as described.

26. In combination in train stop apparatus, a trackway block system, brake applying apparatus on the vehicle, a clear, caution and danger signal on the vehicle, a pair of relays controlling the said signals, circuit connections including the clear signal and the front contacts of the relays, circuit connections from the back contacts of the relays to the caution and danger signals, electro-magnetic timing means, a main relay, circuit connections controlled thereby in which the coil of one of the signal relay is included, and circuit connections also controlled by said relay in which the timing means contacts and the coil of the other signal relay is included, circuit connections controlled by said relay in which the coil of the timing means is included, and governor means operated according to the speed of the train, and controlling a circuit connection through the contacts of the timing means and the coil of said other signal relay, independently of the main relay, and a primary relay for controlling the main relay by the electrical conditions of the block, said primary relay receiving current from the traffic rail system, due to the potential drop between the points where the said relay is in electrical connection therewith substantially as described.

27. In combination in train stop apparatus, a trackway block system, brake applying apparatus on the vehicle, a clear, caution apparatus on the vehicle, a pair of and danger signal on the vehicle, a pair of relays controlling the said signals, circuit connections including the clear signal and the front contacts of the relays, circuit connections from the back contacts of the relays to the caution and danger signal, electro-magnetic timing means, a main relay, circuit connections controlled thereby in which the coil of one of the signal relays is included, and circuit connections also controlled by said relay in which the timing means contacts and the coil of the other signal relay is included, circuit connections controlled by said relay in which the coil of the timing means is included, and governor means operated according to the speed of the train, and controlling a circuit connection through the contacts of the timing means and the coil of said other signal relay, independently of the main relay, and a primary relay for controlling the main relay by the electrical conditions of the block, and a circuit connection controlled by the said governor shunting the timing means, when the main relay breaks the circuits controlled by it, said last mentioned circuit connection controlling current through the governor to the coil of said other signal relay, substantially as described.

28. In combination in train stop apparatus, a trackway block system, brake applying apparatus on the vehicle, a clear, caution and danger signal on the vehicle, a pair of relays controlling the said signals, circuit connections including the clear signal and the front contacts of the relays, circuit connections from the back contacts of the relays to the caution and danger signal, electro-magnetic timing means, a main relay, circuit connections controlled thereby in which the coil of one of the signal relays is included, and circuit connections also controlled by said relay in which the timing means contacts and the coil of the other signal relay is included, circuit connections controlled by said relay in which the coil of the timing means is included, and governor means operated according to the speed of the train, and controlling a circuit connection through the contacts of the timing means and the coil of said other signal relay, independently of the main relay, and a primary relay for controlling the main relay by the electrical conditions of the block, and an air valve with electro-magnetic means controlling the same, the circuit connection thereto being controlled by the timing device, main relay and governor, substantially as described.

29. In combination, apparatus on the vehicle for automatically applying the brakes, and controlling means on the vehicle comprising a primary relay, a secondary relay, a time limit device, a governor controlled by the speed of the vehicle, signals for clear, caution and danger also on the vehicle, and signal relay means, said parts cooperating to apply the brakes and give the danger signal upon entry of the vehicle into a caution block at high speed, defer brake application give a caution signal while the vehicle is proceeding for a prescribed time interval into the block at moderate speed, and thereafter apply the brakes and change the signal from caution to danger, said primary relay being in a conductor receiving current from the rail system due to the potential drop between the points of contact of said conductor therewith substantially as described.

30. In combination, apparatus on the vehicle for automatically applying the brakes, and controlling means on the vehicle comprising a primary relay, a secondary relay, a time limit device, a governor controlled by the speed of the vehicle, signals for clear, caution and danger also on the vehicle, and signal relay means, said parts cooperating to apply the brakes and give the danger signal upon entry of the vehicle into a caution block at high speed, defer brake application give a caution signal while the vehicle is proceeding for a prescribed time interval into the block at moderate speed, and thereafter apply the brakes and change the signal from caution to danger, and to prevent automatic braking and give the caution signal if the vehicle is traversing said block at a safe low bumping speed.

31. In automatic train stop apparatus, trackway devices belonging to a trackway signalling system, including a track battery, relays, a battery in each block for working the signals and means whereby the current from said signalling operating battery may be impressed on the traffic rail system of a clear block and removed from the rails of a caution block, and apparatus on the vehicle controlled by the presence or absence of the said impressed current including a primary relay in a conductor receiving current from said rail system due to potential drop between its points of contact of said conductor therewith, substantially as described.

32. In combination in apparatus of the class described, a trackway system divided into blocks, each block including a track battery, relays and trackway signal operating batteries and connections whereby current from the said signal operating batteries will be impressed on the rails of a clear block and removed from the rails of the caution block, said connections being controlled by the relays, which in turn are controlled by the shorting of a track battery by a train in a block, and means on the train controlling automatic brake applying apparatus, said means being controlled by the presence or absence of the impressed current, and including a primary relay in a conductor receiving current from said rail system due to potential drop between its points of contact of said conductor therewith, substantially as described.

33. In combination in apparatus of the class described, a trackway system, including parts of a trackway signal system, means controlled by the presence of a train in a block for removing a prescribed direct electric potential from the rails of the caution block, and means on the trains to be controlled by the presence or absence of current in the said rails for in turn controlling brake applying mechanism on the trains including a primary relay in a conductor receiving current from said rail system due to the potential drop between its points of contact of said conductor therewith, substantially as described.

34. In combination in automatic train stop apparatus, means on the vehicle for applying the brakes, controlling means on the vehicle operated by the absence of current in the trackway rails for operating the brake applying means, and means for impressing direct electric current upon the rails of a clear block and removing said current from a caution block, said means being controlled by the presence of a vehicle in the clear block, said controlling means consisting of a relay in a conductor receiving direct current from the rails due to the potential drop between its points of contact therewith, substantially as described.

35. In combination, in automatic train stop apparatus, means on the vehicle for applying the brakes, electrically operated means on the vehicle for controlling the brake applying means, said means being in a conductor having its terminal in contact with the traffic rail system and receiving direct current therefrom due to the potential drop between the points of control on said rail system, a battery having one lead connected to the rail of the block at or near one end and the other lead connected to the other rail at or near the other end of the block, and means for controlling the circuit of the said battery by the presence or absence of a vehicle in an adjacent block, there being a battery and its leads for each block of the trackway system.

36. In combination in automatic train stop apparatus, means on the vehicle for applying the brakes, electrically operated means on the vehicle for controlling the brake applying means, a battery having one lead connected to the rail of the block at or near one end and the other lead connected to the other rail at or near the other end of the block, and means for controlling the circuit of the said battery by the presence or absence of a vehicle in an adjacent block, there being a battery and its leads for each block of the trackway system, the control exerted by said vehicle in the said adjacent block being to render the rails of the first mentioned block dead for deenergizing the electrically operable means on the vehicle for applying the brakes said electrically operated means on the vehicle consisting of a relay in a conductor having its terminals in travelling contact with the rail system and receiving direct current due to the potential drop between the points of contact of said conductor on said rail system.

37. In combination in automatic train stop apparatus, means on the vehicle for applying the brakes, electrically operated means on the vehicle for controlling the brake applying means, said means being in circuit with the trackway rails, a battery having one lead connected to the rail of the block at or near one end and the other lead connected to the other rail at or near the other end of the block, and means for controlling the circuit of the said battery by the presence or absence of a vehicle in an adjacent block, there being a battery and its leads for each block of the trackway system, said battery being split with one section located near each end of the block, substantially as described.

38. In combination, in automatic train stop systems, a trackway divided into blocks, automatic brake applying means on the vehicle, electrically operable means on the vehicle for controlling the automatic brake applying means, a battery for each block for energizing the rails, a conductor in which said electrically operable means on the vehicle is located having its ends in contact with the rails and receiving direct current therefrom and means by which the presence of a vehicle on one block will render the rails of the blocks in advance and in rear thereof of the same electrical condition, substantially as described.

39. In combination in automatic train stop systems, a trackway divided into blocks, track batteries and relays forming parts of a trackway signalling system, one at each end of the block, a battery for each block having its leads extending through other relays to opposite ends of the block and to the different rails of the track respectively, and forming parts of a sectional conductor extending along the trackway, contacts controlled by the relays and controlling the circuit through said sectional conductor to energize the rails of an occupied block and deenergize the rails of an adjacent block or blocks and means on the vehicle for controlling automatic braking and controlled by the absence of direct electric potential in the rails to apply the brakes, said means including a relay in a conductor receiving direct current from the rail system due to the potential drop between the points of contact of said conductor with the rail system substantially as described.

40. In combination in automatic train stop systems, a trackway divided into blocks, track batteries and relays forming parts of a trackway signalling system, one at each end of the block, a battery for each block having its leads extending through other relays to opposite ends of the block and to the different rails of the track respectively, and forming parts of a sectional conductor extending along the trackway, contacts controlled by the relays and controlling the circuit through said sectional conductor to energize the rails of an occupied block and deenergize the rails of an adjacent block or blocks, and means on the vehicle for controlling automatic braking and controlled by the absence of electric potential in the rails to apply the brakes, the battery leads at the adjacent ends of adjacent blocks being connected on opposite sides of the staggered rail joints and with each other through the said block battery to form a local circuit closed by the vehicle wheels to maintain current through the means on the vehicle while the vehicle is passing over said joints, substantially as described.

41. In combination, in automatic train stop apparatus, means on the vehicle for controlling automatic brake applying means on the vehicle, and in circuit with the trackway rails, a conductor extending along the trackway and in sections corresponding to the blocks, relays at the ends of the blocks, a pair of contacts for each sectional conductor and at each end thereof, a pair of armatures for each block, one member at each end thereof, controlled by the relays of said block, said armatures each controlling a contact of the conductor section belonging to its own block, and also a contact belonging to the conductor section of the adjacent block, a split battery for each block, one section of which is at each end of the block, a lead wire connecting with the armatures of adjacent blocks, and with battery sections of adjacent blocks, and leads extending from the battery sections through the relays to the rails one being connected to one rail on one side of the insulated joint and the other being connected to the other rail on the other side of the joint, substantially as described.

42. In combination in train control apparatus means for imposing direct electric current upon the traffic rail system of a block or removing it therefrom, according to conditions of traffic, a relay on the vehicle in a conductor receiving direct current from the rail system due to the potential drop between the points on said system where the ends of the said conductor contact therewith, electromagnetic means energized through said relay for holding the brakes off and allowing brake application when deenergized and means on the vehicle for maintaining said electromagnetic means energized when the vehicle enters non-equipped territory, where no current is imposed on the rail system to thereby prevent automatic brake application, said maintaining means automatically going out of service when the vehicle returns upon the energized territory of the rail system due to the primary relay again picking up current from the rail system, substantially as described.

43. In combination in train control apparatus means for imposing direct electric current upon the traffic rail system of a block or removing it therefrom according to conditions of traffic, a relay on the vehicle in a conductor receiving direct current from the rail system due to the potential drop between the points on said system where the ends of the said conductor contact therewith, electro magnetic means energized through said relay for holding the brakes off, and allowing brake application when deenergized, and means on the vehicle for maintaining said electro magnetic means energized when the vehicle enters non-equipped territory where no current is imposed on the rail system to thereby prevent automatic brake application, said maintaining means automatically going out of service when the vehicle returns upon the energized territory of the rail system due to the primary relay again picking up current from the rail system, said maintaining means including a device manually operable to set the said maintaining means to perform its function, substantially as described.

44. In combination in train control apparatus means for imposing direct electric current upon the traffic rail system of a block or removing it therefrom according to conditions of traffic, a relay on the vehicle in a conductor receiving direct current from the rail system due to the potential drop between the points on said system where the ends of the said conductor contact therewith, electro-magnetic means energized through said relay for holding the brakes off, and allowing brake application when deenergized, and means on the vehicle for maintaining said electro magnetic means energized when the vehicle enters non-equipped territory where no current is imposed on the rail system, to thereby prevent automatic brake application, said maintaining means automatically going out of service when the vehicle returns upon the energized territory of the rail system due to the primary relay again picking up current from the rail system, and means including roadside devices for automatically setting said maintaining means to perform its function on entering non-equipped territory.

45. In combination in train control apparatus, means for imposing direct electric current upon the traffic rail system of a block or removing it therefrom according to conditions of traffic, a relay on the vehicle in a conductor receiving direct current from the rail system due to the potential drop between the points on said system where the ends of the said conductor contact therewith, electro magnetic means energized through said relay for holding the brakes off, and allowing brake application when deenergized, and means on the vehicle for maintaining said electro magnetic means energized when the vehicle enters non-equipped territory where no current is imposed on the rail system, to thereby prevent automatic brake application, said maintaining means automatically going out of service when the vehicle returns upon the energized territory of the rail system due to the primary relay again picking up current from the rail system, said maintaining means including a manually operable device to set the maintaining means and thereafter be beyond further control manually until automatically restored as a consequence of the vehicles return to equipped territory.

46. In combination in automatic train stop apparatus, an engineer's valve for exhausting train pipe air, a governor operated from the moving train, an air valve controlled by said governor, said air valve controlling the release of equalizing air from the equalizing piston chamber of the engineer's automatic brake valve, substantially as described.

47. In combination in automatic train stop apparatus, an engineer's valve for exhausting train pipe air, a governor operated from the moving train, an air valve controlled by said governor, said air valve controlling the release of equalizing air from the equalizing piston chamber of the engineer's automatic brake valve, said governor also controlling the application of the brakes in accordance with the electrical condition of the block, and in accordance with the speed of the train, resulting in a brake application when the speed is above a certain rate or in an application when the speed is at a certain rate and a certain distance into the block has been traversed or maintaining brakes off if the speed is at a safe low rate while the train is traversing the caution block, substantially as described.

48. In combination, means for imposing prescribed direct electric current from the traffic rail system of a block, to be effective from end to end thereof, and for removing said current as prescribed according to conditions of traffic, signal means on the vehicle, electrically operable means on the vehicle for controlling said signal means continuously including a primary relay in a conductor whose ends are constantly in contact with the said rail system to receive direct current therefrom continuously throughout the block when said prescribed imposed current is present, due to the potential drop between the points where the relay conductor contacts with said rail system, whereby continuous control of the signal means is effected, substantially as described.

49. In combination, means for imposing prescribed direct electric current upon the traffic rail system of a block, to be effective from end to end thereof, and for removing said current as prescribed according to conditions of traffic, signal means on the vehicle, electrically operable means on the vehicle for exerting continuous control of the brake applying apparatus and the signal means including a primary relay in a conductor whose terminals are in constant contact with said rail system to receive direct current therefrom continuously throughout the block, when said prescribed imposed current is present, due to the potential drop between the points where the relay conductor contacts with the rail system, whereby continuous control of said brake apparatus and signal means is effected, substantially as described.

50. In combination, means for imposing prescribed direct electric current upon the traffic rail system of a block, to be effective from end to end thereof, and for removing said current as prescribed according to conditions of traffic, brake applying apparatus, signal means on the vehicle comprising clear, caution and danger signals, and means for continuous control of the signalling and of the braking functions comprising electrical apparatus and speed governed means on the vehicle, said electrical apparatus including a primary relay in a conductor receiving direct current from the rail system due to the drop in potential between the points where said conductor terminals contact with the rail system, substantially as described.

51. In combination, means for imposing prescribed direct electric current upon the traffic rail system of a block, to be effective from end to end thereof, and for removing said current as prescribed according to conditions of traffic, brake applying apparatus, signal means on the vehicle comprising, clear, caution and danger signals, and means for continuous control of the signalling and braking functions, comprising electrical apparatus and speed governed means on the vehicle, said electrical apparatus including signal relay means, and a primary relay in a conductor receiving direct current from the rail system continuously when said direct current is imposed thereon, due to the potential drop between the points where said conductor terminals contact with said rail system, the said speed governed means controlling contacts of said electrical apparatus whereby the signals will follow each other in synchronism with the changes in the electrical condition of the rail system of the block, each signal persisting continuously until the change takes place and whereby also continuous control will be exerted upon the brake apparatus from end to end of the block.

52. In combination, means for imposing prescribed direct electric current upon the traffic rail system of a block, to be effective from end to end thereof, and for removing said current as prescribed according to conditions of traffic, brake applying apparatus, signal means on the vehicle comprising clear, caution and danger signals, and means for continuous control of the signalling and braking functions, comprising electrical apparatus and speed governed means on the vehicle, said electrical apparatus including signal relay means, and a primary relay in a conductor receiving direct current from the rail system continuously when said direct current is imposed thereon, due to the potential drop between the points where said conductor terminals contact with said rail system, the said speed governed means controlling contacts of said electrical apparatus whereby the signals will follow each other in synchronism with the changes in the electrical condition of the rail system of the block, each signal persisting continuously until the change takes place and whereby also continuous control will be exerted upon the brake apparatus from end to end of the block, and timing means forming a part of said electrical apparatus to defer brake application in a caution block at moderate speed for a prescribed time interval, substantially as described.

53. In combination, an air valve for supplying air to brake application means, electro-magnetic means for operating said valve, relay means on the vehicle for removing current from the electro-magnetic means for operation of the latter to open the air valve, a valve to prolong the supplying of air from the air valve to the brake application means, means whereby the building up of air pressure will restore said prolonging valve to normal position, the said relay means automatically restoring the electro-magnetic means to normal condition when the trackway conditions change, and a trackway electric system for controlling said relay means according to the conditions of the blocks, substantially as described.

54. In combination, an air valve for supplying air to brake application means, electro-magnetic means for operating said valve, relay means on the vehicle for removing current from the electro-magnetic means for operation of the latter to open the air valve, a valve to prolong the supplying of air from the air valve to the brake application means, means whereby the pressure of air admitted through said air valve will release the air valve from control by the electro-magnetic means for the closing of said air valve, means whereby the building up of air pressure will restore said prolonging valve to normal position, the said relay means automatically restoring the electro-magnetic means to normal condition when the trackway conditions change, and a trackway electric system for controlling said relay means according to the conditions of the blocks, substantially as described.

55. In combination, automatic brake application means on the vehicle, an air inlet valve for supplying air to operate said means for setting the brakes, means including an electro-magnetic device on the vehicle for operating said valve, and means for directing a part of the air supply derived from the opening of said valve to release the electro-magnetic means from said valve for the restoration of the latter to closed position, and means for controlling the energizing and deenergizing of the electro-magnetic means, automatically from the electric trackway system.

56. In combination, automatic brake application means on the vehicle, an air inlet valve for supplying air to operate said means for setting the brakes, means including an electro-magnetic device on the vehicle for operating said valve, and means for directing a part of the air supply derived from the opening of said valve to release the electro-magnetic means from said valve for the restoration of the latter to closed position, and means for controlling the energizing and deenergizing of the electro-magnetic means, automatically from the electric trackway system, said air inlet valve being restored to closed position by the building up of the air pressure between it and the brake application means, substantially as described.

57. In combination in automatic train control apparatus, an engineer's valve, an automatic valve for release of train pipe air, a valve for supplying air to the latter valve for setting it in position to release train pipe air, a trigger valve interposed between the two valves mentioned to prolong the supplying of air for maintaining the automatic air release valve in its operated position for a prescribed time interval, a solenoid which when deenergized opens the air supply valve, and electrical apparatus on the vehicle for controlling current to said solenoid, said apparatus including a primary relay in a conductor receiving current from the traffic rail system due to potential drop between its points of contact therewith, said trigger valve restoring itself to closed position when air pressure builds up beyond it to the prescribed degree, substantially as described.

58. In combination in automatic train control apparatus, an engineer's valve, an automatic valve for release of train pipe air, a valve for supplying air to the latter valve for setting it in position to release train pipe air, a trigger valve interposed between the two valves mentioned to prolong the supplying of air for maintaining the automatic air release valve in its operated position for a prescribed time interval, a solenoid which when deenergized opens the air supply valve, and electrical apparatus on the vehicle for controlling current to said solenoid, said apparatus including a primary relay in a conductor receiving current from the traffic rail system due to potential drop between its points of contact therewith, said trigger valve restoring itself to closed position when air pressure builds up beyond it to the prescribed degree, and an engineer's disabling valve for cutting off the engineer's automatic brake valve from the train pipe to prevent recharging of the train line pipe until after a stop has taken place, said disabling valve being automatically set in its cut off position when the brakes are applied automatically, substantially as described.

59. In combination in train stop apparatus, means for imposing electric current on the traffic carrying rail system, a trackway block system, apparatus on the vehicle for applying the brakes, signal means on the vehicle, said brake applying apparatus and signal means being controlled by the electrical conditions in the block and the speed of the train, and a relay on the vehicle in a conductor receiving current from the rail system, through which relay the control due to the changes in the electrical condition of the block is continuously exerted.

60. In combination in train stop apparatus, means for imposing electric current on the traffic carrying rail system, a trackway block system, apparatus on the vehicle for applying the brakes, signal means on the vehicle, said apparatus and signal means being controlled by the electrical condition in the block system, and by the speed of the train, timing means controlled by the conditions in the block system and also exerting control of the signal means, and a relay on the vehicle in a conductor receiving current from the rail system through which relay the control due to the changes in the electric condition of the block is continuously exerted.

61. In train stop apparatus the combination of brake applying apparatus on the vehicle, electro-magnetic means in a circuit for holding the brakes off when said circuit is closed, electro-magnetic timing means controlling a contact in circuit with the electro-magnetic means first mentioned, a primary relay to receive current from the traffic rail system and controlling the circuit to said electro-magnetic timing means, speed governor controlled contacts in circuit at prescribed speeds with the electro-magnetic means first mentioned through the contacts controlled by the timing electro-magnetic means, said apparatus, in a clear block, through the said primary relay, being energized to hold the brakes off, in a caution block at high speed, deenergizing the electro-magnetic means first mentioned; in a caution block at moderate speed deenergizing the primary relay and therefore the timing device, but maintaining the circuit to the electro magnetic means first mentioned through the governor contacts and the timing device contact until the latter is opened at the end of the prescribed time interval, substantially as described.

62. In train stop apparatus the combination of brake applying apparatus on the vehicle, electro-magnetic means in a circuit for holding the brakes off when said circuit is closed, electro-magnetic timing means controlling a contact in circuit with the electro-magnetic means first mentioned, a primary relay to receive current from the traffic rail system and controlling the circuit to said electro-magnetic timing means, speed governor controlled contacts in circuit at prescribed speeds with the electro magnetic means first mentioned through the contacts controlled by the timing electro-magnetic means, said apparatus, in a clear block, through the said primary relay, being energized to hold the brakes off; in a caution block at high speed deenergizing the electro-magnetic means first mentioned; in a caution block at moderate speed deenergizing the primary relay, and therefore the timing device, but maintaining the circuit to the electro-magnetic means first mentioned through the governor contacts and the timing device contact until the latter is opened at the end of the prescribed time interval, and at low speed, maintaining the circuit to said electro-magnetic means first mentioned, through a low speed governor contact, substantially as described.

63. In combination in train stop apparatus, a trackway block system, brake applying apparatus on the vehicle, signals on the vehicle, automatic means for applying the brakes and displaying the danger signal when danger conditions exist, with the vehicle running at high speed, automatic means for delaying the application of the brakes and for displaying the caution signal while the train is running at moderate speed for a prescribed interval in the danger zone, and for displaying a danger signal and for applying the brakes if the train progresses beyond said prescribed interval.

64. In combination in train stop apparatus, a trackway block system, brake applying apparatus on the vehicle, signals on the vehicle, automatic means for applying the brakes and displaying the danger signal when danger conditions exist, with the vehicle running at high speed, automatic means for delaying the application of the brakes and for displaying the caution signal while the train is running at moderate speed for a prescribed interval in a danger zone, and for displaying a danger signal and applying the brakes if the train progresses beyond said interval, and for holding the brakes off and displaying a caution signal if the train is traversing the danger zone at a prescribed low speed.

65. In combination in automatic train stop apparatus, means on the vehicle for applying the brakes, electrically operated means on the vehicle for controlling the brake applying means, said means being in a conductor extending diagonally of the vehicle and with its terminals in contact with the traffic rail system and receiving current therefrom due to the potential drop between the points of contact on said rail system, a battery having one lead connected to the rail of the block at or near one end and the other lead connected to the other rail at or near the other end of the block, and means for controlling the circuit of said battery by the presence or absence of a vehicle in an adjacent block, there being a battery and its leads for each block of the trackway system, substantially as described.

66. In combination in train stop apparatus, a track divided into blocks, apparatus on the vehicle for applying the brakes, signal means on the vehicle comprising a clear signal, a caution signal, and a danger signal, means for deenergizing a caution block, said brake apparatus operating to apply the brakes automatically and displaying the danger signal on entering the deenergized caution block at high speed and deferring automatic braking and displaying the caution signal on entering said caution block at a prescribed moderate speed, and thereafter applying the brakes and displaying the danger signal if unsafe conditions in advance persist.

In testimony whereof, I affix my signature.

PATRICK J. CLIFFORD.